US012811648B2

(12) United States Patent
Lee et al.

(10) Patent No.: US 12,811,648 B2
(45) Date of Patent: Nov. 24, 2026

(54) TECHNIQUES FOR CHANNEL STATE INFORMATION FEEDBACK WITH HETEROGENEOUS PANEL DEPLOYMENT

(71) Applicant: QUALCOMM Incorporated, San Diego, CA (US)

(72) Inventors: Hyojin Lee, San Diego, CA (US); Yu Zhang, San Diego, CA (US); Hung Dinh Ly, San Diego, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 256 days.

(21) Appl. No.: 18/580,466

(22) PCT Filed: Sep. 9, 2021

(86) PCT No.: PCT/CN2021/117398

§ 371 (c)(1),
(2) Date: Jan. 18, 2024

(87) PCT Pub. No.: WO2023/035174

PCT Pub. Date: Mar. 16, 2023

(65) Prior Publication Data

US 2025/0080187 A1 Mar. 6, 2025

(51) Int. Cl.
*H04B 7/06* (2006.01)

(52) U.S. Cl.
CPC ....... *H04B 7/0626* (2013.01); *H04B 7/06968* (2023.05)

(58) Field of Classification Search
CPC . H04B 7/0626; H04B 7/06968; H04B 7/0469
See application file for complete search history.

(56) References Cited

U.S. PATENT DOCUMENTS 12,494,837 B2 * 12/2025 Hindy ................ H04B 7/06952
2018/0309490 A1 10/2018 Rahman et al.
2019/0181934 A1 * 6/2019 Kang .................... H04W 72/20
(Continued)

FOREIGN PATENT DOCUMENTS

CN 112514275 A * 3/2021 ........... H04B 7/0486
CN 113746573 A * 12/2021 ........... H04B 7/0626
(Continued)

OTHER PUBLICATIONS

International Search Report and Written Opinion—PCT/CN2021/117398—ISA/EPO—Mar. 11, 2022.

*Primary Examiner* — Sujoy K Kundu
*Assistant Examiner* — Vladislav Y Agureyev
(74) *Attorney, Agent, or Firm* — Holland & Hart LLP / Qualcomm

(57) ABSTRACT

Methods, systems, and devices for wireless communications are described. A base station may transmit a channel state information (CSI) reference signal (CSI-RS) to a user equipment (UE) using heterogenous antenna panels, where a first antenna panel used to transmit the CSI-RS may have a different number of antenna ports than a second antenna panel used to transmit the CSI-RS. The UE may generate a codebook to report CSI based on the heterogenous antenna panels. In some cases, the UE may report compressed CSI if the antenna panels are in close proximity together.

30 Claims, 18 Drawing Sheets

(56) References Cited

U.S. PATENT DOCUMENTS

| | | | | |
|---|---|---|---|---|
| 2019/0229786 | A1* | 7/2019 | Huang | H04B 7/0478 |
| 2019/0260453 | A1 | 8/2019 | Huang et al. | |
| 2020/0083943 | A1* | 3/2020 | Rahman | H04B 7/0482 |
| 2020/0220592 | A1* | 7/2020 | Ryu | H04B 7/0691 |
| 2020/0314854 | A1* | 10/2020 | Chen | H04W 72/53 |
| 2020/0358505 | A1* | 11/2020 | Park | H04B 7/0456 |
| 2021/0320700 | A1* | 10/2021 | Nam | H04W 76/28 |
| 2021/0336673 | A1* | 10/2021 | Taherzadeh Boroujeni | H04W 72/542 |
| 2022/0124740 | A1* | 4/2022 | Ji | H04B 7/024 |
| 2022/0304018 | A1* | 9/2022 | Ko | H04W 72/23 |
| 2022/0353707 | A1* | 11/2022 | Cirik | H04L 5/0096 |
| 2023/0061346 | A1* | 3/2023 | Park | H04W 72/563 |
| 2023/0125760 | A1* | 4/2023 | Fan | H04B 7/0626 |
| 2023/0171623 | A1* | 6/2023 | Zeineddine | H04L 5/0057 370/252 |
| 2023/0291441 | A1* | 9/2023 | Muruganathan | H04B 7/0417 |
| 2023/0327727 | A1* | 10/2023 | Hindy | H04B 7/06952 370/329 |
| 2023/0370141 | A1* | 11/2023 | Hindy | H04B 7/0639 |
| 2024/0097752 | A1* | 3/2024 | Wang | H04B 7/024 |
| 2024/0297701 | A1* | 9/2024 | Lee | H04B 7/0621 |

FOREIGN PATENT DOCUMENTS

| | | | | | |
|---|---|---|---|---|---|
| CN | 114303431 | A | * | 4/2022 | H04W 72/569 |
| CN | 115485983 | A | * | 12/2022 | H04W 72/1268 |
| CN | 111264036 | B | * | 1/2023 | H04W 72/046 |
| KR | 20230041095 | A | * | 3/2023 | H04B 7/06952 |
| WO | WO-2018031807 | A1 | | 2/2018 | |
| WO | WO-2021214713 | A1 | * | 10/2021 | H04L 5/0035 |
| WO | WO-2022009178 | A1 | * | 1/2022 | H04W 24/08 |

* cited by examiner

TECHNIQUES FOR CHANNEL STATE INFORMATION FEEDBACK WITH HETEROGENEOUS PANEL DEPLOYMENT

CROSS REFERENCE

The present application is a 371 national stage filing of International PCT Application No. PCT/CN2021/117398 by LEE et al. entitled "TECHNIQUES FOR CHANNEL STATE INFORMATION FEEDBACK WITH HETEROGENOUS PANEL DEPLOYMENT," filed Sep. 9, 2021, which is assigned to the assignee hereof, and which is expressly incorporated by reference in its entirety herein.

FIELD OF TECHNOLOGY

The following relates to wireless communications, including techniques for channel state information feedback with heterogenous panel deployment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may apply a precoding for a channel state information (CSI) reference signal (CSI-RS) based on a precoding matrix to transmit the CSI-RS using multiple antenna panels. Some techniques for generating the precoding matrix and reporting channel state information are deficient.

SUMMARY

The described techniques relate to improved methods, systems, devices, and apparatuses that support techniques for channel state information (CSI) feedback with heterogenous panel deployment.

A method for wireless communications at a user equipment (UE) is described. The method may include receiving an indication of one or more CSI reference signal (CSI-RS) resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different, generating a codebook based on the total number of antenna ports, a set of multiple precoders corresponding to the set of multiple antenna panels, the one or more CSI-RS resources, and a set of inter-panel co-phasing parameters, and transmitting a CSI report including one or more sets of CSI parameters based on the codebook.

An apparatus for wireless communications at a UE is described. The apparatus may include a processor, memory coupled with the processor, and instructions stored in the memory. The instructions may be executable by the processor to cause the apparatus to receive an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different, generate a codebook based on the total number of antenna ports, a set of multiple precoders corresponding to the set of multiple antenna panels, the one or more CSI-RS resources, and a set of inter-panel co-phasing parameters, and transmit a CSI report including one or more sets of CSI parameters based on the codebook.

Another apparatus for wireless communications at a UE is described. The apparatus may include means for receiving an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different, means for generating a codebook based on the total number of antenna ports, a set of multiple precoders corresponding to the set of multiple antenna panels, the one or more CSI-RS resources, and a set of inter-panel co-phasing parameters, and means for transmitting a CSI report including one or more sets of CSI parameters based on the codebook.

A non-transitory computer-readable medium storing code for wireless communications at a UE is described. The code may include instructions executable by a processor to receive an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different, generate a codebook based on the total number of antenna ports, a set of multiple precoders corresponding to the set of multiple antenna panels, the one or more CSI-RS resources, and a set of inter-panel co-phasing parameters, and transmit a CSI report including one or more sets of CSI parameters based on the codebook.

In some examples of the method, apparatuses, and non-transitory computer-readable medium described herein, receiving the indication may include operations, features, means, or instructions for receiving an indication of a single CSI-RS resource associated with the total number of antenna ports across the set of multiple antenna panels.

Some examples of the method, apparatuses, and non-transitory computer-readable medium described herein may further include operations, features, means, or instructions for determining a single set of CSI parameters based on the codebook.

Some examples of the method, apparatuses, and non-transitory computer-readable medium described herein may further include operations, features, means, or instructions for receiving an indication of a per-antenna panel quasi co-location (QCL) configuration based on the set of multiple antenna panels at the base station being distributed.

In some examples of the method, apparatuses, and non-transitory computer-readable medium described herein, receiving the indication may include operations, features, means, or instructions for receiving an indication of a set of multiple CSI-RS resources corresponding to a number of antenna panels in the set of multiple antenna panels.

Some examples of the method, apparatuses, and non-transitory computer-readable medium described herein may further include operations, features, means, or instructions for determining a set of CSI parameters for each antenna panel of the set of multiple antenna panels based on the codebook.

In some examples of the method, apparatuses, and non-transitory computer-readable medium described herein, a rank indicator and a channel quality indicator for each set of CSI parameters and the set of inter-panel co-phasing parameters may be jointly determined based on the total number of antenna ports.

Some examples of the method, apparatuses, and non-transitory computer-readable medium described herein may further include operations, features, means, or instructions for receiving control signaling indicating to disable CSI reporting for an antenna panel of the set of multiple antenna panels.

Some examples of the method, apparatuses, and non-transitory computer-readable medium described herein may further include operations, features, means, or instructions for mapping the set of multiple precoders to the one or more CSI-RS resources based on respective CSI-RS indexes.

Some examples of the method, apparatuses, and non-transitory computer-readable medium described herein may further include operations, features, means, or instructions for receiving an indication of a configuration for the set of multiple antenna panels, where the first antenna panel of the set of multiple antenna panels may have more antenna elements in a vertical direction than a horizontal direction, and the second antenna panel of the set of multiple antenna panels may have more antenna elements in the horizontal direction than the vertical direction.

In some examples of the method, apparatuses, and non-transitory computer-readable medium described herein, transmitting the CSI report may include operations, features, means, or instructions for indicating a single index pair for a precoding matrix indicator for the set of multiple antenna panels based on the set of multiple antenna panels being co-located.

Some examples of the method, apparatuses, and non-transitory computer-readable medium described herein may further include operations, features, means, or instructions for applying an oversampling rate to a first number of beams for the first antenna panel of the set of multiple antenna panels to correspond to a second number of beams of the second antenna panel of the set of multiple antenna panels.

Some examples of the method, apparatuses, and non-transitory computer-readable medium described herein may further include operations, features, means, or instructions for indicating an association between a first number of beams for the first antenna panel and a second number of beams for the second antenna panel, where the first number of beams and the second number of beams may be different.

In some examples of the method, apparatuses, and non-transitory computer-readable medium described herein, the single index pair corresponds to the first antenna panel of the set of multiple antenna panels, and the CSI report includes differential index pair for a remaining set of antenna panels of the set of multiple antenna panels.

A method for wireless communications at a base station is described. The method may include transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different and receiving a CSI report including one or more sets of CSI parameters based on a codebook generated at the UE.

An apparatus for wireless communications at a base station is described. The apparatus may include a processor, memory coupled with the processor, and instructions stored in the memory. The instructions may be executable by the processor to cause the apparatus to transmit, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different and receive a CSI report including one or more sets of CSI parameters based on a codebook generated at the UE.

Another apparatus for wireless communications at a base station is described. The apparatus may include means for transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different and means for receiving a CSI report including one or more sets of CSI parameters based on a codebook generated at the UE.

A non-transitory computer-readable medium storing code for wireless communications at a base station is described. The code may include instructions executable by a processor to transmit, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different and receive a CSI report including one or more sets of CSI parameters based on a codebook generated at the UE.

In some examples of the method, apparatuses, and non-transitory computer-readable medium described herein, transmitting the indication may include operations, features, means, or instructions for transmitting an indication of a single CSI-RS resource associated with the total number of antenna ports across the set of multiple antenna panels.

In some examples of the method, apparatuses, and non-transitory computer-readable medium described herein, receiving the CSI report may include operations, features, means, or instructions for receiving the CSI report including a single set of CSI parameters.

Some examples of the method, apparatuses, and non-transitory computer-readable medium described herein may further include operations, features, means, or instructions for transmitting an indication of a per-antenna panel QCL configuration based on the set of multiple antenna panels at the base station being distributed.

In some examples of the method, apparatuses, and non-transitory computer-readable medium described herein, transmitting the indication may include operations, features, means, or instructions for transmitting the indication of a set of multiple CSI-RS resources corresponding to a number of antenna panels in the set of multiple antenna panels.

In some examples of the method, apparatuses, and non-transitory computer-readable medium described herein, receiving the CSI report may include operations, features, means, or instructions for receiving a set of CSI parameters for each antenna panel of the set of multiple antenna panels.

In some examples of the method, apparatuses, and non-transitory computer-readable medium described herein, a rank indicator and a channel quality indicator for each set of CSI parameters and a set of inter-panel co-phasing parameters may be jointly calculated based on the total number of antenna ports.

Some examples of the method, apparatuses, and non-transitory computer-readable medium described herein may further include operations, features, means, or instructions for transmitting control signaling indicating to disable CSI reporting for an antenna panel of the set of multiple antenna panels.

Some examples of the method, apparatuses, and non-transitory computer-readable medium described herein may further include operations, features, means, or instructions for transmitting an indication of a configuration for the set of multiple antenna panels, where the first antenna panel of the set of multiple antenna panels may have more antenna elements in a vertical direction than a horizontal direction, and the second antenna panel of the set of multiple antenna panels may have more antenna elements in the horizontal direction than the vertical direction.

In some examples of the method, apparatuses, and non-transitory computer-readable medium described herein, receiving the CSI report may include operations, features, means, or instructions for receiving an indication of a single index pair for a precoding matrix indicator for the set of multiple antenna panels based on the set of multiple antenna panels being co-located.

Some examples of the method, apparatuses, and non-transitory computer-readable medium described herein may further include operations, features, means, or instructions for receiving an indication of an association between a first number of beams for the first antenna panel and a second number of beams for the second antenna panel, where the first number of beams and the second number of beams may be different.

In some examples of the method, apparatuses, and non-transitory computer-readable medium described herein, the single index pair corresponds to the first antenna panel of the set of multiple antenna panels, and the CSI report includes differential index pair for a remaining set of antenna panels of the set of multiple antenna panels.

DETAILED DESCRIPTION

Figure 1:
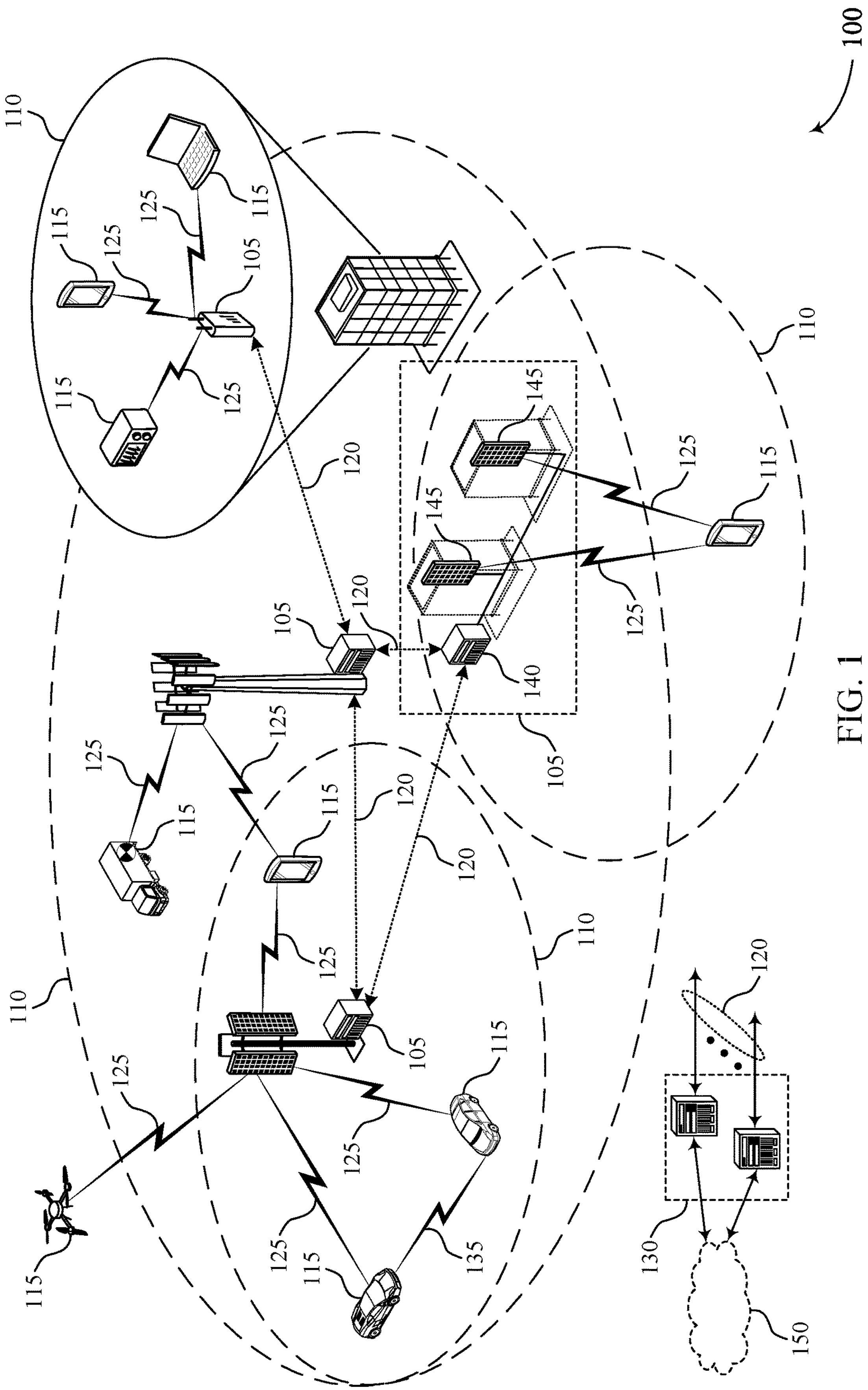
FIG. 1 illustrates an example of a wireless communications system that supports techniques for channel state information (CSI) feedback with heterogenous panel deployment in accordance with aspects of the present disclosure.

A base station may implement a heterogenous panel deployment, where different antenna panels at the base station include different numbers of antenna ports. The antenna panels may be co-located or distributed at the base station. For co-located antenna panels, multiple panels may be deployed closely together, with small inter-panel spacing. For distributed antenna panels, multiple panels may be separated, with some spacing between the panels. The base station may transmit a channel state information (CSI) reference signal (RS) using one or more panels and the respective antenna ports. The base station may apply a precoding to information bits of the CSI-RS signal to map the directionally transmit the CSI-RS. A user equipment (UE) may receive and measure the CSI-RS to determine CSI, and the UE may transmit a CSI report to the base station to indicate the CSI.

Techniques described herein provide techniques for CSI feedback under heterogenous antenna panel deployment. A base station may generate a CSI-RS to transmit using a number of antenna ports of heterogeneous antenna panels. A UE may receive the CSI-RS and generate a codebook to obtain a precoder matrix for the CSI. The UE may generate the codebook based on the number of antenna panels, antenna ports for the antenna panels, and a set of inter-panel co-phasing parameters. In a first example, the UE may be configured with one CSI-RS resource for the CSI-RS. In the first example, the UE may receive the CSI and transmit a CSI report with one set of CSI components or CSI parameters, such as a rank indicator, precoding matrix indicator (PMI), and channel quality indicator (CQI), based on the generated codebook. In a second example, the UE may be configured with as many resources CSI-RS resources as the number of antenna panels. For the second example, the UE may receive the CSI and transmit a CSI report with as many sets of CSI components as the first number of CSI-RS resources (e.g., as many as the total number of antenna panels).

In some cases, the UE may report a compressed set of CSI information. For example, if a base station is configured with co-located (e.g., closely spaced panels, a distance between co-located panels may be much smaller than a distance between the base station and the UE. Therefore, the beam direction from each panel to the UE may be similar. In some systems, the beam direction of the horizontal domain may correspond to a first index of PMI, and the vertical domain may correspond to a second index of the PMI. For co-located multi-panel configurations, the first index and the second index for panels may be associated such that the UE may report a single index pair that represents the same beam direction for different panels. For heterogenous panel deployment, there may be a different number of beams from each panel. In some cases, the UE may align the number of beams by applying an oversampling factor, and the UE may order the beam indexes for different panels. In some other examples, the UE may report a single index pair for a first panel and provide differential index pairs for other panels.

Aspects of the disclosure are initially described in the context of wireless communications systems. Aspects of the disclosure are further illustrated by and described with reference to apparatus diagrams, system diagrams, and flowcharts that relate to techniques for CSI feedback with heterogenous panel deployment.

FIG. 1 illustrates an example of a wireless communications system 100 that supports techniques for CSI feedback with heterogenous panel deployment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
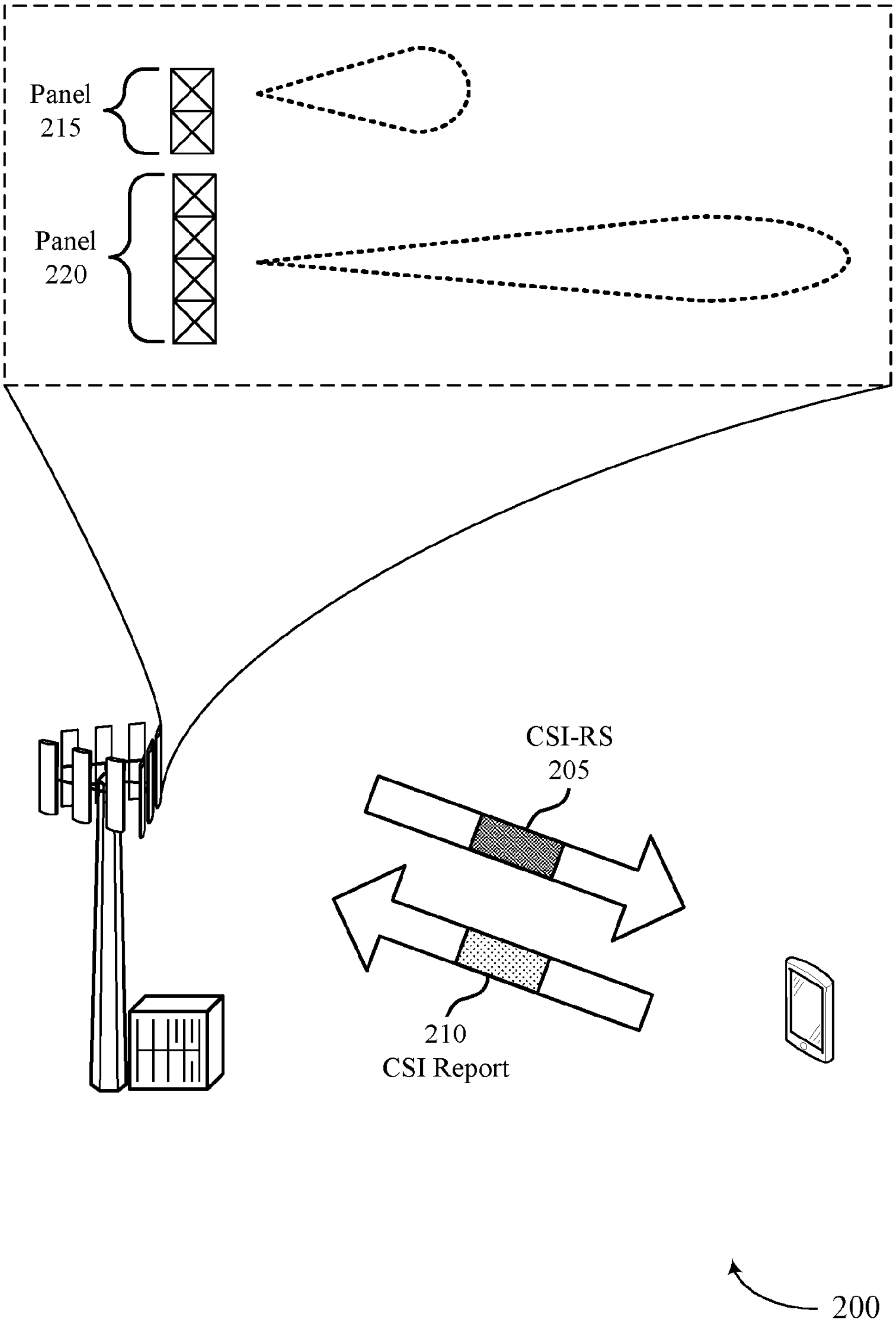
FIG. 2 illustrates an example of a wireless communications system that supports techniques for CSI feedback with heterogenous panel deployment in accordance with aspects of the present disclosure.

FIG. 2 illustrates an example of a wireless communications system 200 that supports techniques for CSI feedback with heterogenous panel deployment in accordance with aspects of the present disclosure. The wireless communications system 200 may include base station 105-*a* and UE 115-*a*, which may be respective examples of a base station 105 as a UE 115 of the wireless communications system 100.

Base station 105-*a* may transmit CSI-RS 205 to UE 115-*a* using multiple antenna ports on one or more antenna panels. UE 115-*a* may measure the CSI-RS 205 and transmit a CSI report 210 to base station 105-*a*. The CSI report 210 may include one or more sets of CSI components, such as a rank indicator, a PMI, and a CQI. Base station 105-*a* may implement a heterogenous panel deployment. For example, a first antenna panel 215 used to transmit the CSI-RS 205 may have a different number of antenna ports than a second antenna panel 220 used to transmit the CSI-RS 205. The first antenna panel 215 and the second antenna panel 220 may be co-located or distributed. For a co-located panel configuration, the panels may be close together. For a distributed panel configuration, the panels may be separated, such as on different sides of the antenna panel array or on different transmission/reception points (TRPs).

The wireless communications system 200 may provide techniques to efficiently report CSI for a heterogenous panel deployment of $N_g$ antenna panels. For example, base station 105-*a* may transmit the CSI-RS 205 using P antenna ports across the first antenna panel 215 and the second antenna panel 220. UE 115-*a* may receive the CSI-RS 205 and determine the CSI components for the CSI report 210. UE 115-*a* may generate a codebook using one or more precoders to determine one or more sets of a rank indicator, a PMI, and a CQI. In some cases, the sum of antenna ports of each of the $N_g$ antenna panels may be equal to P. Antenna port $P_i$ may be related to antenna configuration $$(N_1^{(i)}, N_2^{(i)})$$

with an oversampling factor of $$(O_1^{(i)}, O_2^{(i)}).$$

A per-panel rank may be bounded up to min $(P_1, \ldots, P_{N_g})$ if the same rank per panel is used or assumed.

In a first example, UE 115-*a* may receive an indication of a configuration for CSI-RS resources. For example, UE 115-*a* may receive control signaling (e.g., RRC signaling, downlink control information, or both) from base station 105-*a* configuring a single P-port CSI-RS resource across heterogenous panels. UE 115-*a* may generate a codebook, W, using P-port precoders, as shown by Expression (1) below. For example, $V_i$ may be a precoder derived from a $P_i$-port codebook, and $\varphi_i$ may be an inter-panel co-phasing parameter for the associated precoder.

$$W = \frac{1}{\sqrt{N_g}} \begin{bmatrix} V_1 \\ \varphi_2 V_2 \\ \cdots \\ \varphi_{N_g} V_{N_g} \end{bmatrix} \quad \text{Expression (1)}$$

For the first example, UE 115-*a* may include one set of CSI components including a rank indicator, a PMI, and a CQI. The one set of CSI components may be calculated based on the P-port codebook for precoding. In some cases, UE 115-*a* may be configured with per-panel quasi co-location (QCL) information and per-panel codebook subset restriction (CSR) information before generating CSI components in case of a distributed panel deployment. In some cases, UE 115-*a* may report per-panel CQI, which may reduce energy consumption and support dynamic panel selection.

In a second example, UE 115-*a* may receive an indication of multiple CSI-RS resources. For example, UE 115-*a* may receive control signaling from base station 105-*a* configuring multiple CSI-RS resources, such as one CSI-RS resource for each antenna panel at base station 105-*a*. For example, UE 115-*a* may be configured with $N_g$ CSI-RS resources, and each CSI-RS resource may have $P_i$ ports, where i ranges from 1 to $N_g$. In some cases, UE 115-*a* may be configured with one CSI-RS resource per antenna panel. UE 115-*a* may report $N_g$ sets of CSI components, each including a rank indicator, PMI, and CQI. Each set of CSI components may be for a $P_i$ port CSI-RS based on a $P_i$-port codebook for precoding. UE 115-*a* may determine joint rank indicators and CQI and inter-panel co-phasing parameters, $\varphi_{P_i}$ assuming a P-port precoder using the format of Expression (1), where $V_i$ may be a precoder derived from a $P_i$-port codebook. For example, a joint rank indicator may be jointly calculated based on both a first CSI-RS resource and a second CSI-RS resource together with a joint CQI jointly calculated assuming a P-port precoder using the format of Expression (1). In some cases for the second example, UE 115-*a* may receive control signaling to enable or disable per-CSI-RS reporting. For example, UE 115-*a* may be configured to disable per-CSI-RS rank indicator, PMI, and CQI reporting.

In some cases, UE 115-*a* may identify, indicate, or receive an indication of a joint transmission QCL association. For example, UE 115-*a* may identify a QCL relationship between a demodulation reference signal (DMRS) and multiple reference signals transmitted from multiple TRPs. UE 115-*a* may support combining propagation combinations of TRPs to calculate composite channel characteristics.

In some cases, base station 105-*a* may be configured with co-located antenna panels, where the distance between the co-located panels is negligible compared to a distance between base station 105-*a* and UE 115-*a*. Due to the close proximity of the co-located panels and the distance between base station 105-*a* and UE 115-*a*, the beam direction for each of the panels toward UE 115-*a* may be very similar.

For heterogenous multi-panel transmission, the wireless communications system 200 may support multiple different configurations of ports per CSI-RS. For example, base station 105-*a* may use 2, 4, 8, 12, 16, 24, or 32 antenna ports per CSI-RS. For the first example, P may be equal to the sum of $P_1$ through $P_{N_g}$, and each $P_i$ may be one of the different number of configurable antenna ports. For example, if base station 105-*a* uses P=8 ports for CSI-RS, base station 105-*a* may have three heterogenous panels with 2 ports, 2 ports, and 4 ports, respectively. Similarly, for 16 ports, base station 105-*a* may have two panels with 4 ports and 8 ports, or three panels with 2 ports, 2 ports, and 8 ports, or four panels with 2 ports, 2 ports, 4 ports, and 4 ports. Similar configurations, combinations, or variations may be provided for other P-port CSI-RS configurations. For multiple CSI-RS resource reporting, each $P_i$ may be one of the configurable number of antenna ports. These configurations are exemplary, and base station 105-*a* may support different numbers of antenna ports, antenna panels, or per-panel antenna ports, among other configurations.

In some cases, UE 115-*a* may report compressed CSI if base station 105-*a* transmits the CSI-RS 205 using co-located antenna panels. For example, a beam direction from the first antenna panel 215 and the second antenna panel 220 may be very similar to UE 115-*a*, so UE 115-*a* may feedback a single PMI index pair for both panels instead of reporting separate PMI index pairs for the two panels. These techniques are described in more detail with reference to FIG. 4.

In some cases, CSI-RS ports may be indexed within a panel. For example, CSI-RS ports may begin at port 3000 in a first CSI-RS resource associated with a first panel, and another port 3000 in a second CSI-RS resource associated with a second panel. In some cases, the UE 115 may map the CSI-RS ports based on a resource identifier. For example, an index for the first CSI-RS resource port for the first panel may be referred to as $y^{3000,1}$, being the first panel, and the index for the first CSI-RS resource port for the second panel may be referred to as $y^{3000,2}$, being the second panel. In some cases, the ports may be ordered first by the resource identifier, then the port index within a resource in an ascending order or a descending order, or a combination thereof.

Figure 3:
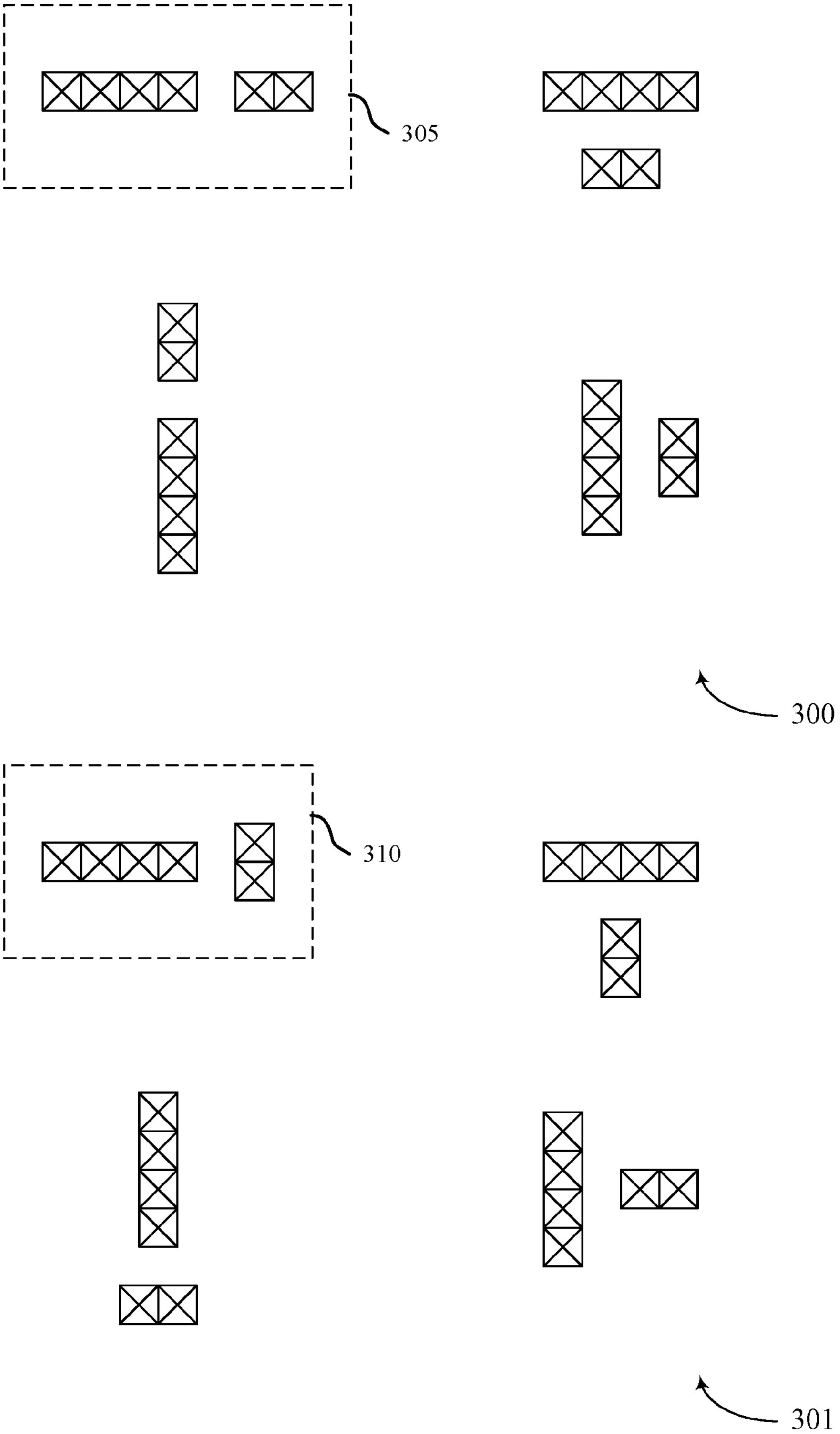
FIG. 3 illustrates examples of heterogenous antenna panel configurations that support techniques for CSI feedback with heterogenous panel deployment in accordance with aspects of the present disclosure.

FIG. 3 illustrates examples of heterogenous antenna panel configurations 300 and 301 that supports techniques for CSI feedback with heterogenous panel deployment in accordance with aspects of the present disclosure. A base station 105 or a UE 115, or both, may be configured with heterogeneous antenna panels, where different antenna panels may have different numbers of antenna ports. The antenna panels may be co-located (e.g., grouped together in close proximity) or distributed (e.g., spatially separated, such as on different sides of the device or separate TRPs). As described herein, an antenna port $P_i$ may be associated with an antenna configuration $$\left(N_1^{(i)}, N_2^{(i)}\right).$$

For example, for a two-panel heterogenous configuration, $$N_1^{(i)} \text{ and } N_1^{(j)},$$

where i≠j, may denote a number of antenna elements in the same domain for the two panels, either a horizontal domain or a vertical domain. The values $$N_2^{(i)} \text{ and } N_2^{(j)}$$

may denote a number of antenna elements in the other domain.

The heterogenous antenna panel configurations 300 show some examples for two panel configurations. For example, the heterogenous antenna panel configurations 300 show some examples where $$N_g = 2, \left(N_1^{(i)}, N_2^{(i)}\right) = (4, 1), \text{ and } \left(N_1^{(2)}, N_2^{(2)}\right) = (2, 1).$$

For an antenna panel configuration 305, a first antenna panel has four antenna elements in the horizontal domain and one antenna element in the vertical domain, and a second antenna panel has two antenna elements in the horizontal domain and one antenna element in the vertical domain. Some other non-inclusive variations for these values of this configuration are shown.

Some wireless communications systems do not support antenna panel configurations where $$N_2^{(i)}$$

is larger than $$N_1^{(i)}.$$

In heterogeneous panel scenarios described herein, combining between a precoder in $$\left(N_1^{(i)}, N_2^{(i)}\right)$$

and a precoder $$\left(N_1^{(j)}, N_2^{(j)}\right)$$

is different from that between $$\left(N_1^{(i)}, N_2^{(i)}\right)$$

and $$\left(N_2^{(j)}, N_1^{(j)}\right),$$

where i≠j.

Techniques described herein enable some antenna panel configurations where some antenna panels are longer in different domains. For example, for the heterogeneous antenna panel configurations 301, there may be two antenna panels, where $$N_g = 2, \left(N_1^{(i)}, N_2^{(i)}\right) = (4, 1), \text{ and } \left(N_1^{(2)}, N_2^{(2)}\right) = (2, 1).$$

For an antenna panel configuration 310, a first antenna panel has four elements in the horizontal domain and one antenna elements in the vertical domain. A second antenna panel of the antenna panel configuration 310 has one antenna element in the horizontal domain and two antenna elements in the vertical domain. In some cases, a UE 115 or a base station 105, or both, may be configured with a codebook for a case where $$N_1^{(i)}$$

is smaller than $$N_2^{(i)}.$$

Figure 4:
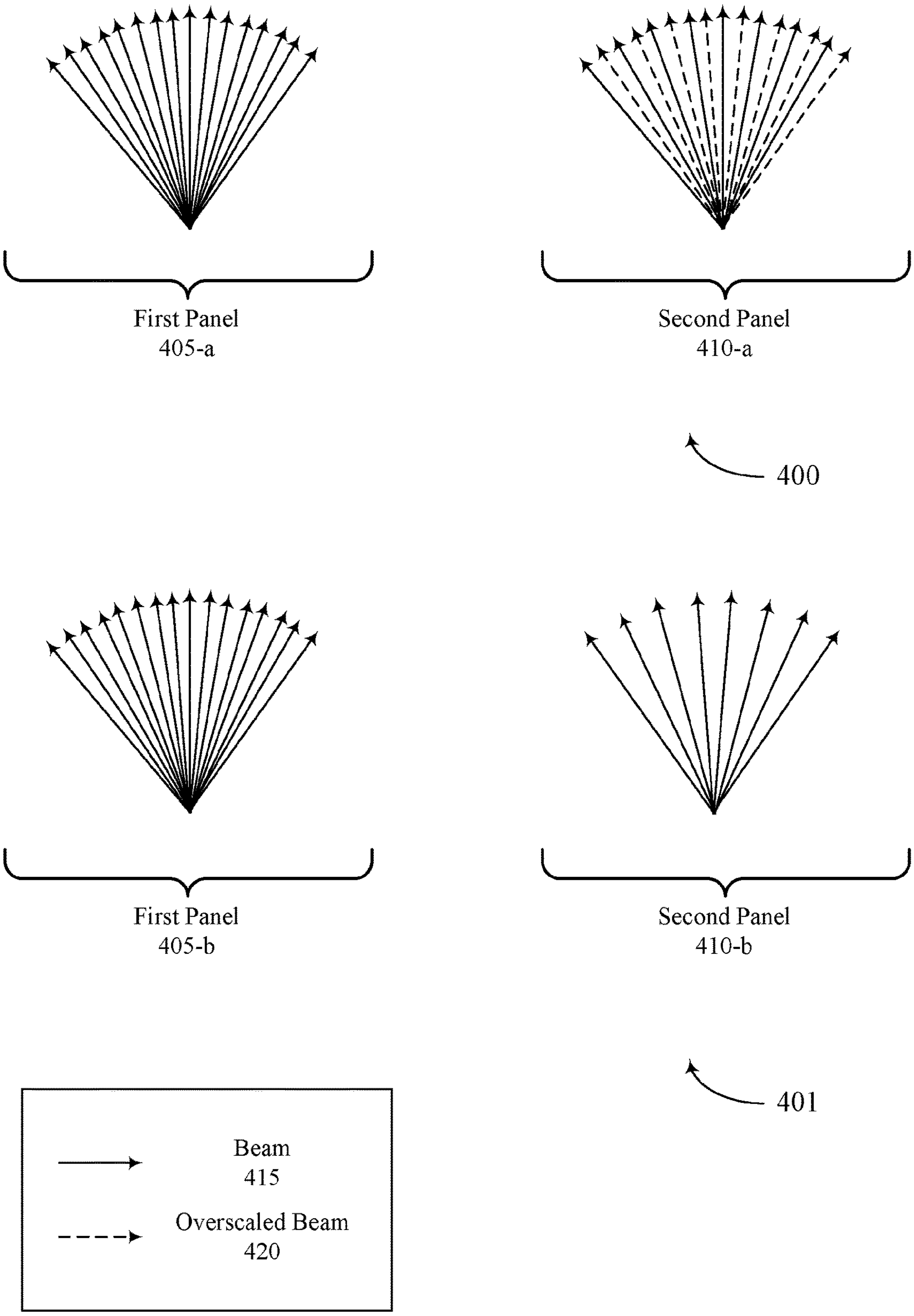
FIG. 4 illustrates examples of CSI compression configurations that support techniques for CSI feedback with heterogenous panel deployment in accordance with aspects of the present disclosure.

FIG. 4 illustrates examples of CSI compression configurations 400 and 401 that support techniques for CSI feedback with heterogenous panel deployment in accordance with aspects of the present disclosure.

A base station 105 may transmit CSI-RS to a UE 115 using co-located heterogenous antenna panels. For example, a first antenna panel and a second antenna panel may be in close proximity and may have different numbers of antenna elements. Since a distance between the co-located panels may be very small compared to a distance between the base station 105 and the UE 115, beam directions from the panels to the UE 115 may be very similar or the same. For some codebooks, a beam direction of the horizontal domain may correspond to index $i_{1,1}$, and a beam direction of the horizontal domain may correspond to the index $i_{1,2}$. There may be an association or relationship between the $i_{1,1}$ and $i_{1,2}$ values for the different panels, and the UE 115 may use this relationship to transmit reduced or compressed CSI feedback, decreasing CSI feedback overhead.

The CSI compression configuration 400 shows an example of reporting a single index pair for multiple panels. In a first example, the UE 115 may align the number of beams and the order of beam indexing for different panels, and the UE 115 may report a single index pair (e.g., $(i_{1,1}, i_{1,2})$ which represents the beam direction for both panels. In some cases, the UE 115 may align the number of beams by using a larger oversampling rate and reporting a single PMI. For example, if $$\left(N_1^{(1)}, N_2^{(1)}\right) = (2, 1) \text{ and } \left(N_1^{(2)}, N_2^{(2)}\right) = (4, 1),$$

the UE 115 may use an oversampling rate $$O_1^{(1)}$$

of 8 and an oversampling rate $$O_1^{(2)}$$

of 4 to have 16 beams for both panels in the horizontal domain while $$O_2^{(1)} \text{ and } O_2^{(2)}$$

are both equal to 1 in the vertical domain. For example, the first panel 405-*a* may have 16 beams 415, and the second panel 410-*a* may have 8 beams 415 and 8 overscaled beams 420. CSI including $i_{1,1}$ may be derived with a form of the precoder shown by Expression (2) below, where $V_n(i_{1,1}, i_{1,2})$ is the precoder indexed $(i_{1,1}, i_{1,2})$ in a single-panel codebook with parameters $$\left(N_1^{(n)}, N_2^{(n)}\right)$$

and $$\left(O_1^{(n)}, O_2^{(n)}\right).$$

$$W = \frac{1}{\sqrt{2}}\begin{bmatrix} V_1(i_{1,1}, 0) \\ \varphi_2 V_2(i_{1,1}, 0) \end{bmatrix} \quad \text{Expression (2)}$$

In some cases, $$O_d^{(n)} = 4 \times \left(\frac{N_d^{(n_d^*)}}{N_d^{(n)}}\right),$$

where d=1, 2, n=1, . . . , $N_g$, and $n_d^*$=

$$\text{argmax}_{n\in\{1,\ldots,N_g\}} N_d^{(n)}.$$

CSI including $i_{1,1}$ and $i_{1,2}$ may be determined assuming the overall form of the precoder is given by Expression (3) below.

$$W = \frac{1}{\sqrt{N_g}}\begin{bmatrix} V_1(i_{1,1}, i_{1,2}) \\ \varphi_2 V_2(i_{1,1}, i_{1,2}) \\ \cdots \\ \varphi_{N_g} V_{N_g}(i_{1,1}, i_{1,2}) \end{bmatrix} \quad \text{Expression (3)}$$

In another example, the number of beams may not be changed, and the UE 115 may specify a mapping from the reported index to the beam index. For example, the CSI compression configuration 401 shows an example of reporting a single beam index pair for multiple panels. The UE 115 may specify a mapping between beam of the first panel 405-*b* and beams of the second panel 410-*b*. For example, each beam of the second panel 410-*b* may be associated with two beams of the first panel 405-*b*. For example, if $$\left(N_1^{(1)}, N_2^{(1)}\right) = (2, 1) \text{ and } \left(N_1^{(2)}, N_2^{(2)}\right) = (4, 1),$$

the UE 115 may use an oversampling rate $$O_1^{(1)} = O_1^{(2)} = 4$$

to have 8 and 16 beams for the two panels in the horizontal domain, while $$O_1^{(1)} = O_1^{(1)} = 1$$

in the vertical domain. CSI, including $i_{1,1}$, may be derived based on Codebook (4) below, where $$i_{1,1}^{(1)} = \left\lfloor \frac{N_1^{(1)} O_1^{(1)}}{N_1^{(2)} O_1^{(2)}} \cdot i_{1,1} \right\rfloor,\ i_{1,1}^{(2)} = i_{1,1},$$

and $$i_{1,1} = 0, 1, \ldots, N_1^{(2)} O_1^{(2)} - 1.$$

In some cases, $$n_d^* = \operatorname{argmax}_{n \in \{1, \ldots N_g\}} N_d^{(n)}$$

or $$n_d^* = \operatorname{argmax}_{n \in \{1, \ldots N_g\}} N_d^{(n)} O_d^{(n)},\ d = 1, 2.$$

$$W = \frac{1}{\sqrt{2}} \begin{bmatrix} V_1\left(i_{1,1}^{(1)}, 0\right) \\ \varphi_2 V_2\left(i_{1,1}^{(2)}, 0\right) \end{bmatrix} \quad \text{Expression (4)}$$

CSI, including $i_{1,1}$ and $i_{1,2}$ may be derived based on Expression (5) below, where $$i_{1,d}^{(n)} = \left\lfloor \frac{N_d^{(n)} O_d^{(n)}}{N_d^{(n_d^*)} O_d^{(n_d^*)}} \cdot i_{1,d} \right\rfloor,\ n = 1, 2, \ldots, N_g,\ i_{1,d} = 0, 1, \ldots, N_d^{(n_d^*)} O_d^{(n_d^*)} - 1,$$

and d=1,2.

$$W = \frac{1}{\sqrt{N_g}} \begin{bmatrix} V_1\left(i_{1,1}^{(1)}, i_{1,2}^{(1)}\right) \\ \varphi_2 V_2\left(i_{1,1}^{(2)}, i_{1,2}^{(2)}\right) \\ \vdots \\ \varphi_{N_g} V_{N_g}\left(i_{1,1}^{(N_g)}, i_{1,2}^{(N_g)}\right) \end{bmatrix} \quad \text{Expression (5)}$$

In some examples, the UE 115 may align the number of beams based on using an oversampling factor and report differential PMI. For example, if $$\left(N_1^{(1)}, N_2^{(1)}\right) = (2, 1) \text{ and } \left(N_1^{(2)}, N_2^{(2)}\right) = (4, 1),$$

the UE 115 may use $$O_1^{(1)} = 4 \times \left(\frac{N^{(2)}}{N^{(1)}}\right) = 8$$

and $$O_1^{(2)} = 4$$

to have 16 beams for both panels in the horizontal domain, while $$O_2^{(1)} = O_2^{(2)} = 1$$

beam in vertical domain. CSI, including $$i_{1,1}^{(1)} \text{ and } \Delta i_{1,1}^{(2)},$$

may be derived by Expression (6) below, where $$i_{1,1}^{(2)} = \left(i_{1,1}^{(1)} + \Delta i_{1,1}^{(2)}\right) \bmod N_1^{(1)} O_1^{(1)}.$$

$$W = \frac{1}{\sqrt{2}} \begin{bmatrix} V_1\left(i_{1,1}^{(1)}, 0\right) \\ \varphi_2 V_2\left(i_{1,1}^{(2)}, 0\right) \end{bmatrix} \quad \text{Expression (6)}$$

In some cases, $$O_d^{(n)} = 4 \times \left(\frac{N_d^{(n_d^*)}}{N_d^{(n)}}\right),$$

where $d = 1, 2$, $n = 1, \ldots, N_g$, and $n_d^* = \operatorname{argmax}_{n \in \{1, \ldots N_g\}} N_d^{(n)}$.

CSI, including $$i_{1,1}^{(1)}, \Delta i_{1,1}^{(2)}, \ldots, \Delta i_{1,1}^{(N_g)} \text{ and } i_{1,2}^{(1)}, \Delta i_{1,2}^{(2)}, \ldots, \Delta i_{1,2}^{(N_g)},$$

may be derived based on Expression (7) below, where $i_{1,d}^{(1)} = \left(i_{1,d}^{(1)} + \Delta i_{1,d}^{(n)}\right) \bmod N_d^{(1)} O_d^{(1)}$, $n = 2, 3, \ldots, N_g$ and $d = 1, 2$ $$W = \frac{1}{\sqrt{N_g}} \begin{bmatrix} V_1\left(i_{1,1}^{(1)}, i_{1,2}^{(1)}\right) \\ \varphi_2 V_2\left(i_{1,1}^{(2)}, i_{1,2}^{(2)}\right) \\ \vdots \\ \varphi_{N_g} V_{N_g}\left(i_{1,1}^{(N_g)}, i_{1,2}^{(N_g)}\right) \end{bmatrix} \quad \text{Expression (7)}$$

Figure 5:
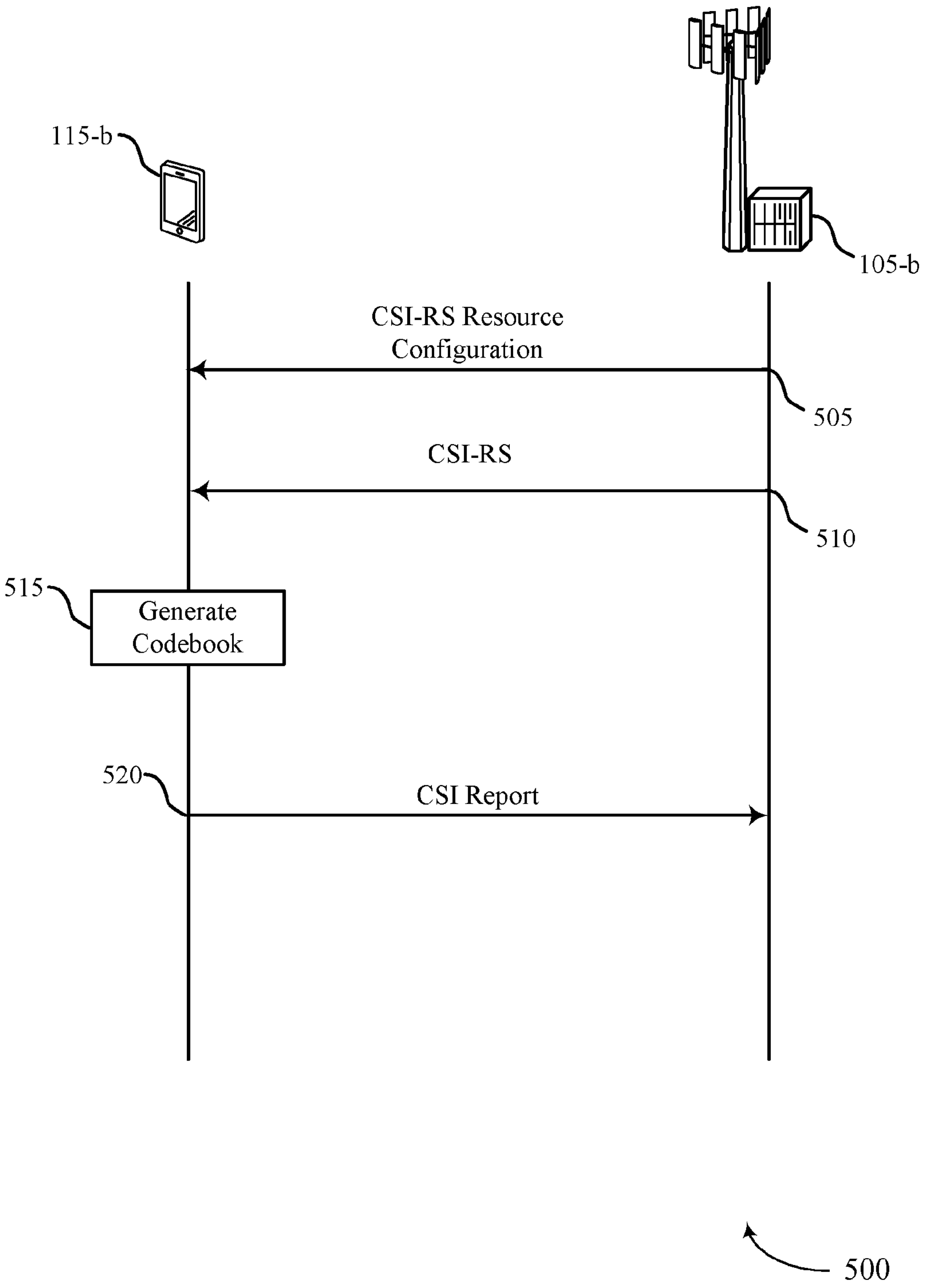
FIG. 5 illustrates an example of a process flow that supports techniques for CSI feedback with heterogenous panel deployment in accordance with aspects of the present disclosure.

FIG. 5 illustrates an example of a process flow 500 that supports techniques for CSI feedback with heterogenous panel deployment in accordance with aspects of the present disclosure. The process flow 500 may be implemented by UE 115-*b* or base station 105-*b*, or both, which may be respective examples of a UE 115 and a base station 105 as described herein. In some cases, some operations or signaling of the process flow 500 may occur in different order than shown. Additionally, or alternatively, some additional processes or signaling may be performed or some processes or signaling shown may not be performed, or both.

At 505, UE 115-*b* may receive an indication (e.g., from base station 105-*b*) of one or more CSI-RS resources for a CSI-RS transmitted using a total number of antenna ports on a set of multiple antenna panels at base station 105-*b*. Base station 105-*b* may be configured for homogenous antenna panels, where a first antenna panel of the set of antenna panels includes a first number of antenna ports, and a second antenna panel of the set of antenna panels includes a second number of antenna ports, where the first number and the second number are different. For example, a first antenna panel may include 4 antenna elements, and the second antenna panel may include two antenna elements. At 510, base station 105-*b* may transmit one or more CSI-RS on the one or more CSI-RS resources.

UE 115-*b* may receive the CSI-RS and determine CSI. At 515, UE 115-*b* may generate a codebook based on the total number of antenna ports, a set of multiple precoders corresponding to the set of multiple antenna panels, the one or more CSI-RS resources, and a set of inter-panel co-phasing parameters.

In some cases, UE 115-*b* may configured with a single CSI-RS resource associated with the total number of antenna ports across the set of multiple panels. In this example, UE 115-*b* may determine a single set of CSI parameters based on the codebook. For example, UE 115-*b* may determine a single CQI, PMI, and rank indicator for the CSI report.

In some cases, UE 115-*b* may be configured with a set of multiple CSI-RS resources corresponding to the number of antenna panels in the set of multiple antenna panels. In this example, UE 115-*b* may determine multiple sets of CSI parameters corresponding to the number of CSI-RS resources based on the codebook. For example, UE 115-*b* may report one set of CSI parameters for each CSI-RS resource.

At 520, UE 115-*b* may transmit a CSI report including the one or more sets of CSI parameters based on the codebook. For example, UE 115-*b* may report the single set of CSI parameters (e.g., for the single CSI-RS resource), or UE 115-*b* may report the multiple sets of CSI parameters (e.g., one set for each of the multiple sets of CSI-RS resources).

In some cases, UE 115-*b* may report compressed CSI. For example, the antenna panels at base station 105-*b* may be co-located, such that a beam direction for the different panels is very similar, or the same, to UE 115-*b* based on the distance between UE 115-*b* and base station 105-*b*. UE 115-*b* may indicate a single index pair for the PMI for the set of multiple antenna panels based on the antenna panels at base station 105-*b* being co-located. In some cases, UE 115-*b* may apply an oversampling rate to a first number of beams for a first antenna panel of base station 105-*b* to correspond to a second number of beams of a second antenna panel. In some examples, UE 115-*b* may indicate an association between a first number of beams for a first antenna panel and a second number of beams for a second antenna panel. In some examples, the association may be indicated with the CSI report. Additionally, or alternatively, base station 105-*b* may indicate the association to UE 115-*b*. In some cases, UE 115-*b* may report a single index pair for a first antenna panel, and UE 115-*b* may report differential index pair information for a remaining set of antenna panels.

Figure 6:
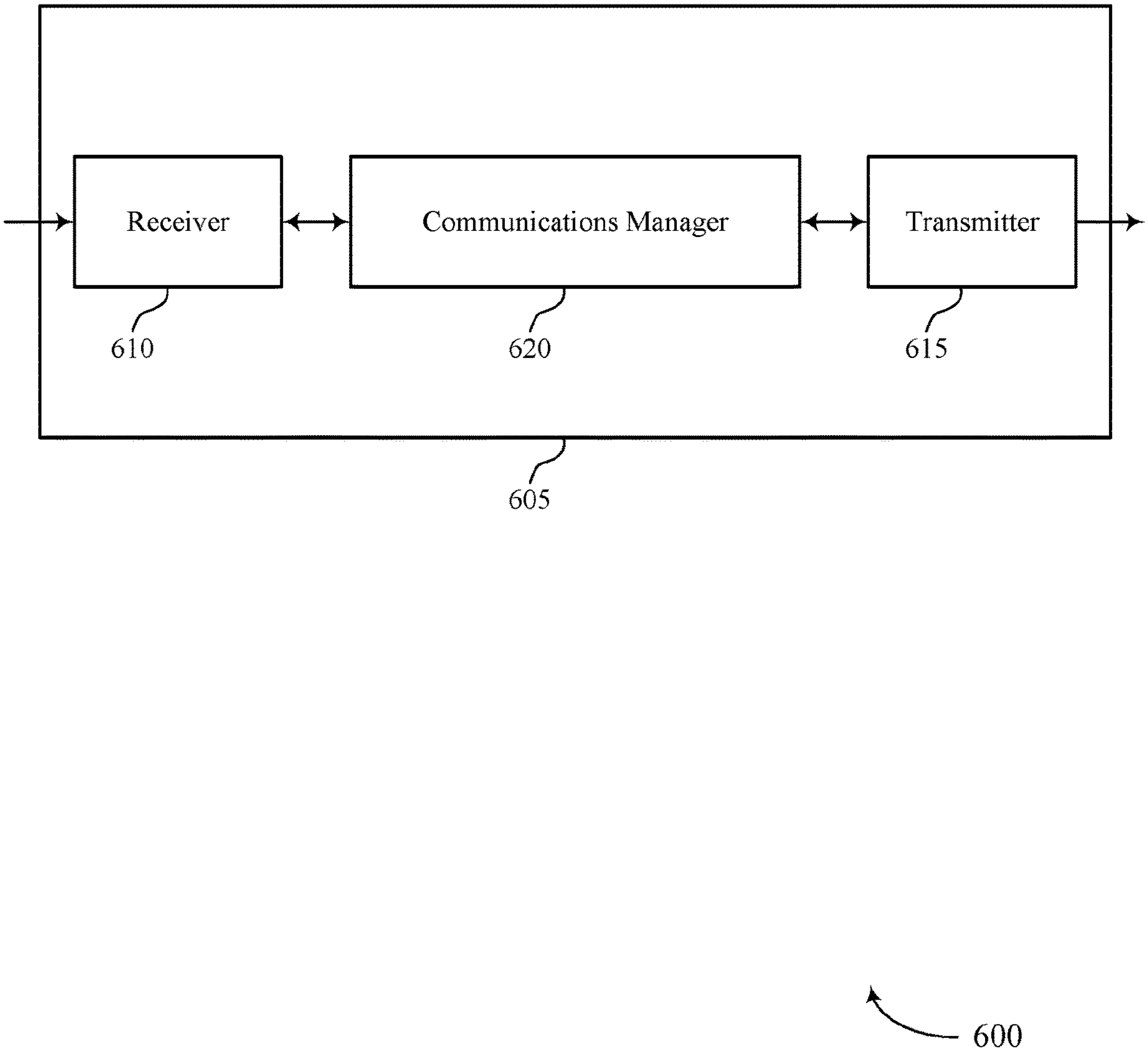
FIGS. 6 and 7 show block diagrams of devices that support techniques for CSI feedback with heterogenous panel deployment in accordance with aspects of the present disclosure.

FIG. 6 shows a block diagram 600 of a device 605 that supports techniques for CSI feedback with heterogenous panel deployment in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for CSI feedback with heterogenous panel deployment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for CSI feedback with heterogenous panel deployment). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for CSI feedback with heterogenous panel deployment as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving an indication of indicating one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different. The communications manager 620 may be configured as or otherwise support a means for generating a codebook based on the total number of antenna ports, a set of multiple precoders corresponding to the set of multiple antenna panels, the one or more CSI-RS resources, and a set of inter-panel co-phasing parameters. The communications manager 620 may be configured as or otherwise support a means for transmitting a CSI report including one or more sets of CSI parameters based on the codebook.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced CSI feedback overhead.

Figure 7:
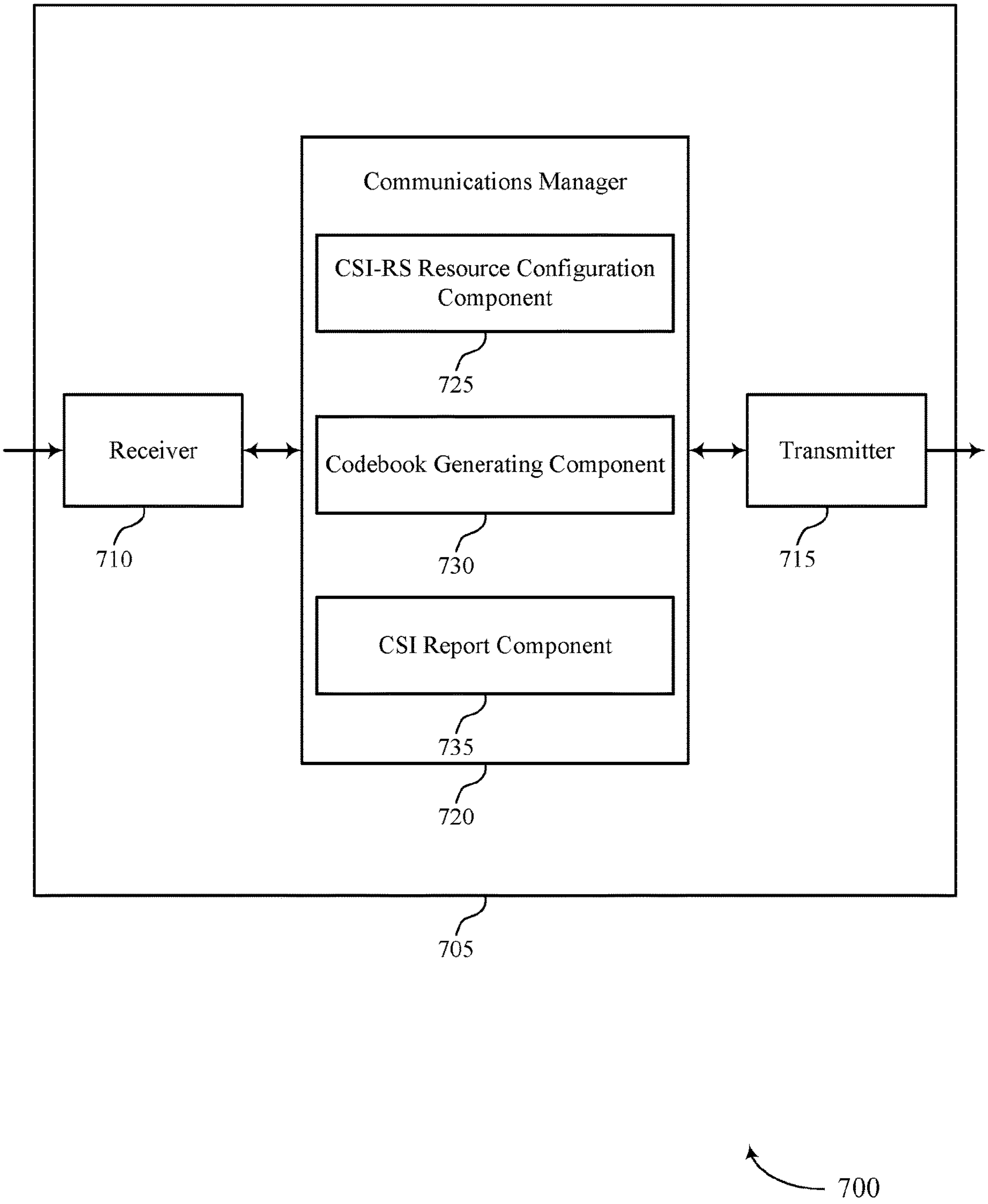

FIG. 7 shows a block diagram 700 of a device 705 that supports techniques for CSI feedback with heterogenous panel deployment in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for CSI feedback with heterogenous panel deployment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for CSI feedback with heterogenous panel deployment). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for CSI feedback with heterogenous panel deployment as described herein. For example, the communications manager 720 may include a CSI-RS resource configuration component 725, a codebook generating component 730, a CSI report component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The CSI-RS resource configuration component 725 may be configured as or otherwise support a means for receiving an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different. The codebook generating component 730 may be configured as or otherwise support a means for generating a codebook based on the total number of antenna ports, a set of multiple precoders corresponding to the set of multiple antenna panels, the one or more CSI-RS resources, and a set of inter-panel co-phasing parameters. The CSI report component 735 may be configured as or otherwise support a means for transmitting a CSI report including one or more sets of CSI parameters based on the codebook.

Figure 8:
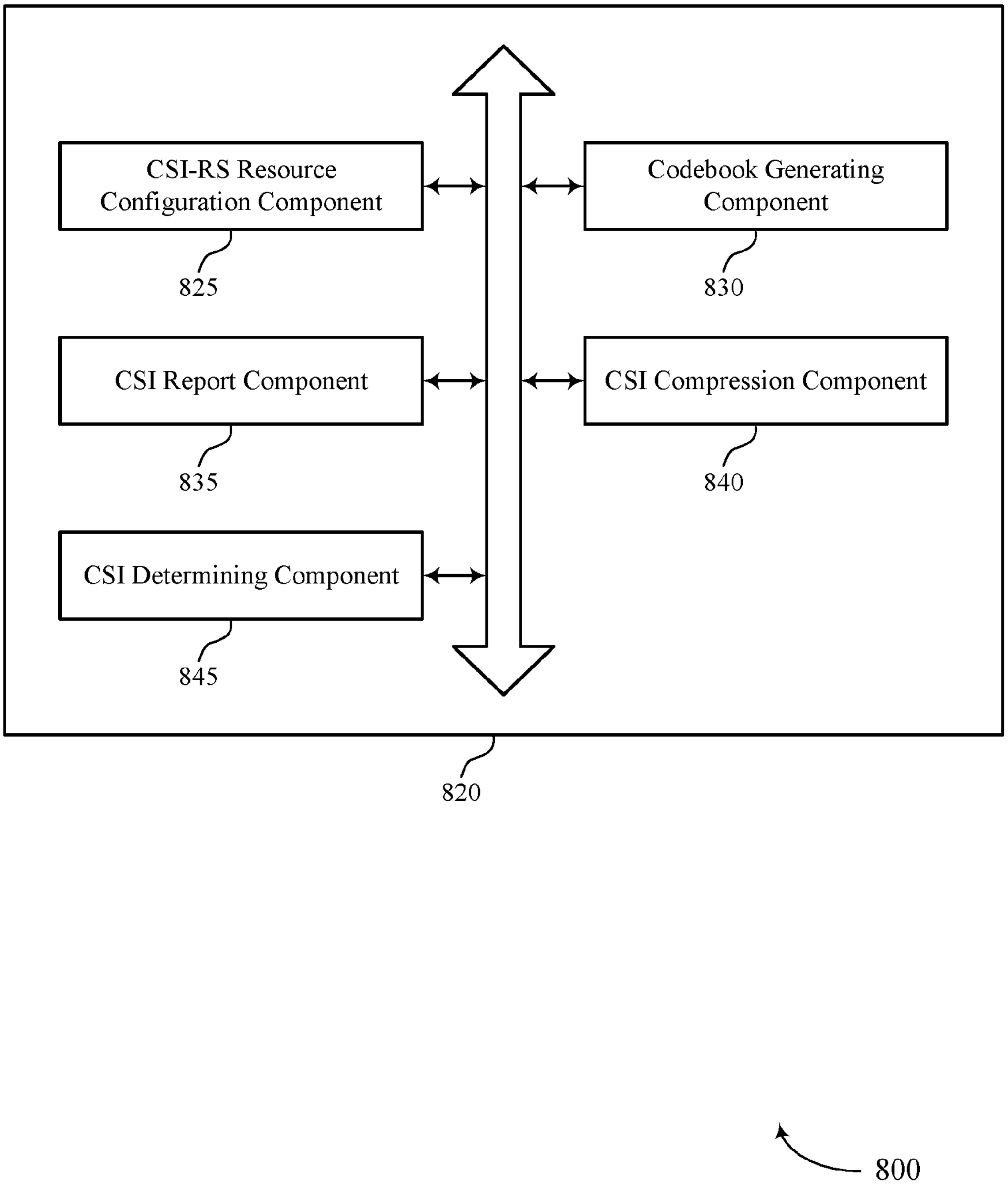
FIG. 8 shows a block diagram of a communications manager that supports techniques for CSI feedback with heterogenous panel deployment in accordance with aspects of the present disclosure.

FIG. 8 shows a block diagram 800 of a communications manager 820 that supports techniques for CSI feedback with heterogenous panel deployment in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for CSI feedback with heterogenous panel deployment as described herein. For example, the communications manager 820 may include a CSI-RS resource configuration component 825, a codebook generating component 830, a CSI report component 835, a CSI compression component 840, a CSI determining component 845, or any combination thereof. Each of these components may communicate, directly or indirectly, with one another (e.g., via one or more buses).

The communications manager 820 may support wireless communications at a UE in accordance with examples as disclosed herein. The CSI-RS resource configuration component 825 may be configured as or otherwise support a means for receiving an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different. The codebook generating component 830 may be configured as or otherwise support a means for generating a codebook based on the total number of antenna ports, a set of multiple precoders corresponding to the set of multiple antenna panels, the one or more CSI-RS resources, and a set of inter-panel co-phasing parameters. The CSI report component 835 may be configured as or otherwise support a means for transmitting a CSI report including one or more sets of CSI parameters based on the codebook.

In some examples, to support receiving the indication, the CSI-RS resource configuration component 825 may be configured as or otherwise support a means for receiving the indication of a single CSI-RS resource associated with the total number of antenna ports across the set of multiple antenna panels.

In some examples, the CSI determining component 845 may be configured as or otherwise support a means for determining a single set of CSI parameters based on the codebook.

In some examples, the CSI-RS resource configuration component 825 may be configured as or otherwise support a means for receiving an indication of a per-antenna panel QCL configuration based on the set of multiple antenna panels at the base station being distributed.

In some examples, to support receiving the indication, the CSI-RS resource configuration component 825 may be configured as or otherwise support a means for receiving the indication of a set of multiple CSI-RS resources corresponding to a number of antenna panels in the set of multiple antenna panels.

In some examples, the CSI determining component 845 may be configured as or otherwise support a means for determining a set of CSI parameters for each antenna panel of the set of multiple antenna panels based on the codebook.

In some examples, a rank indicator and a channel quality indicator for each set of CSI parameters and the set of inter-panel co-phasing parameters are jointly determined based on the total number of antenna ports.

In some examples, the CSI-RS resource configuration component 825 may be configured as or otherwise support a means for receiving control signaling indicating to disable CSI reporting for a first antenna panel of the set of multiple antenna panels.

In some examples, the codebook generating component 830 may be configured as or otherwise support a means for mapping the set of multiple precoders to the one or more CSI-RS resources based on respective CSI-RS indexes.

In some examples, the CSI-RS resource configuration component 825 may be configured as or otherwise support a means for receiving an indication of a configuration for the set of multiple antenna panels, where a first antenna panel of the set of multiple antenna panels has more antenna elements in a vertical direction than a horizontal direction, and a second antenna panel of the set of multiple antenna panels has more antenna elements in the horizontal direction than the vertical direction.

In some examples, to support transmitting the CSI report, the CSI compression component 840 may be configured as or otherwise support a means for indicating a single index pair for the precoding matrix indicator for the set of multiple antenna panels based on the set of multiple antenna panels being co-located.

In some examples, the CSI compression component 840 may be configured as or otherwise support a means for applying an oversampling rate to a first number of beams for a first antenna panel of the set of multiple antenna panels to correspond to a second number of beams of a second antenna panel of the set of multiple antenna panels.

In some examples, the CSI compression component 840 may be configured as or otherwise support a means for indicating an association between a first number of beams for a first antenna panel and a second number of beams for a second antenna panel, where the first number of beams and the second number of beams are different.

In some examples, the single index pair corresponds to a first antenna panel of the set of multiple antenna panels, and the CSI report includes differential index pair for a remaining set of antenna panels of the set of multiple antenna panels.

Figure 9:
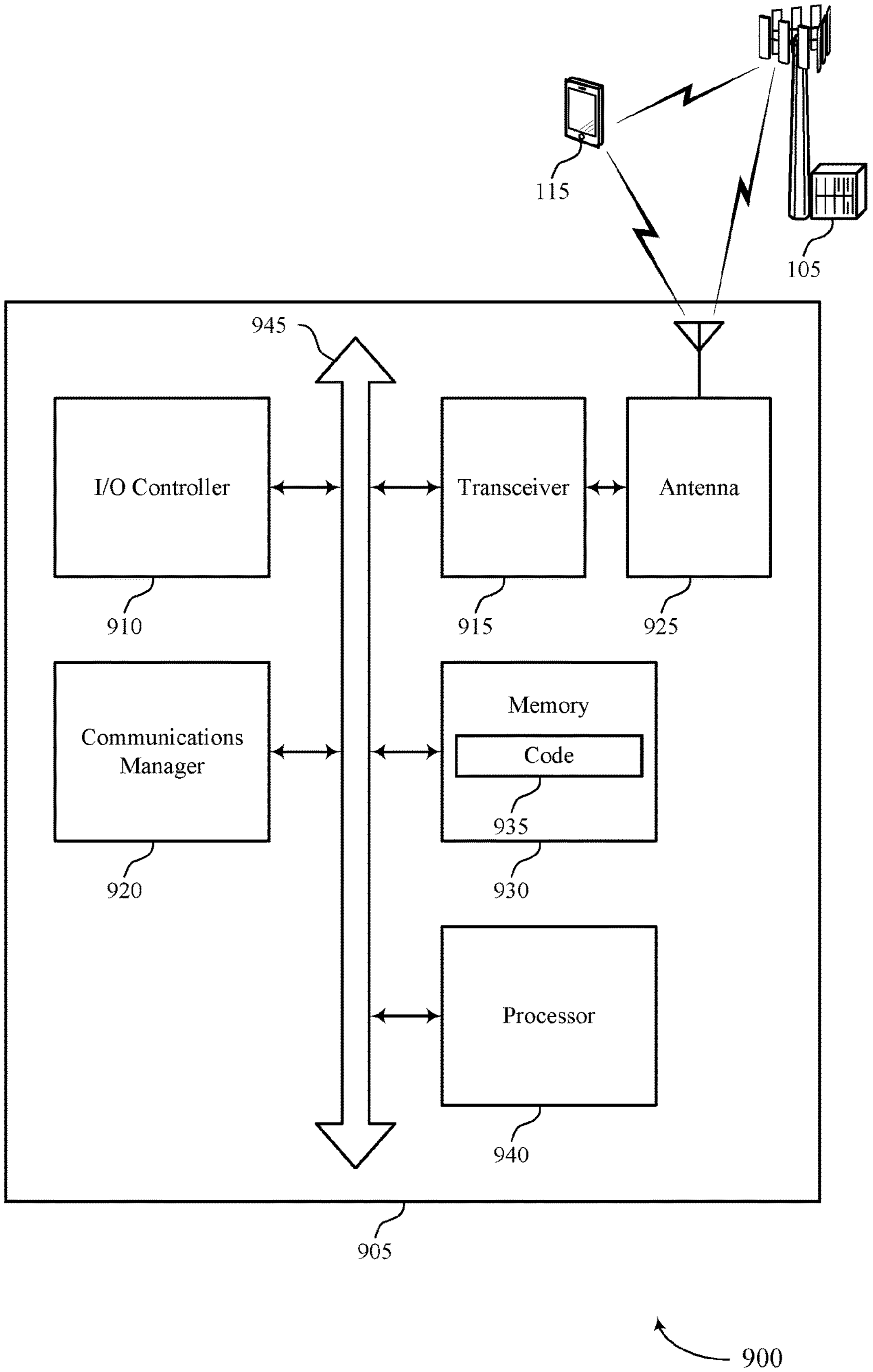
FIG. 9 shows a diagram of a system including a device that supports techniques for CSI feedback with heterogenous panel deployment in accordance with aspects of the present disclosure.

FIG. 9 shows a diagram of a system 900 including a device 905 that supports techniques for CSI feedback with heterogenous panel deployment in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for CSI feedback with heterogenous panel deployment). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different. The communications manager 920 may be configured as or otherwise support a means for generating a codebook based on the total number of antenna ports, a set of multiple precoders corresponding to the set of multiple antenna panels, the one or more CSI-RS resources, and a set of inter-panel co-phasing parameters. The communications manager 920 may be configured as or otherwise support a means for transmitting a CSI report including one or more sets of CSI parameters based on the codebook.

By including or configuring the communications manager 920 in accordance with examples as described herein, the device 905 may support techniques for more efficient utilization of communication resources and reduced overhead for reporting CSI.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for CSI feedback with heterogenous panel deployment as described herein, or the processor 940 and the memory 930 may be otherwise configured to perform or support such operations.

Figure 10:
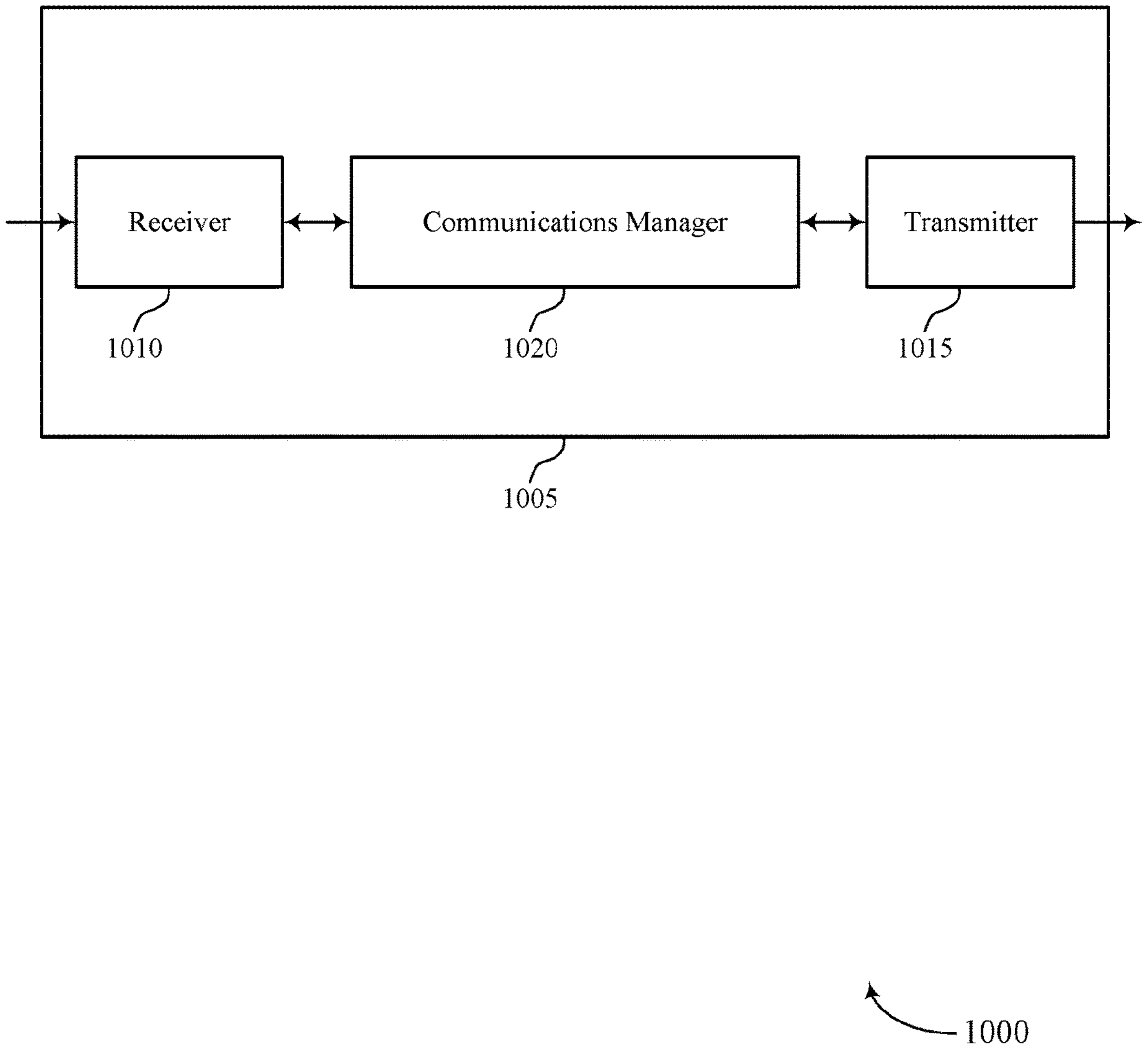
FIGS. 10 and 11 show block diagrams of devices that support techniques for CSI feedback with heterogenous panel deployment in accordance with aspects of the present disclosure.

FIG. 10 shows a block diagram 1000 of a device 1005 that supports techniques for CSI feedback with heterogenous panel deployment in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for CSI feedback with heterogenous panel deployment). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for CSI feedback with heterogenous panel deployment). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for CSI feedback with heterogenous panel deployment as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The communications manager 1020 may be configured as or otherwise support a means for receiving a CSI report including one or more sets of CSI parameters based on a codebook generated at the UE.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
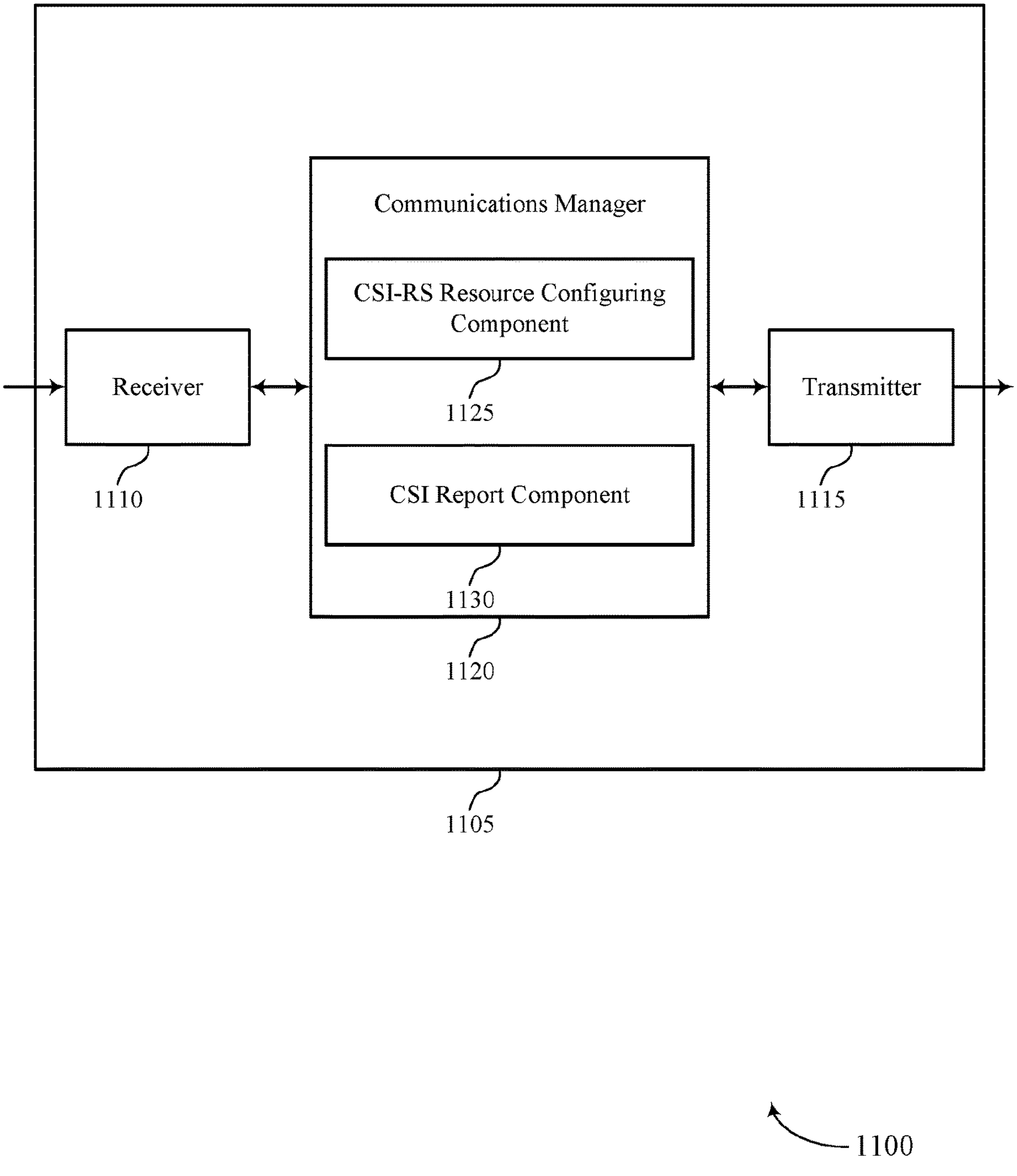

FIG. 11 shows a block diagram 1100 of a device 1105 that supports techniques for CSI feedback with heterogenous panel deployment in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for CSI feedback with heterogenous panel deployment). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for CSI feedback with heterogenous panel deployment). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for CSI feedback with heterogenous panel deployment as described herein. For example, the communications manager 1120 may include a CSI-RS resource configuring component 1125 a CSI report component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The CSI-RS resource configuring component 1125 may be configured as or otherwise support a means for transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The CSI report component 1130 may be configured as or otherwise support a means for receiving a CSI report including one or more sets of CSI parameters based on a codebook generated at the UE.

Figure 12:
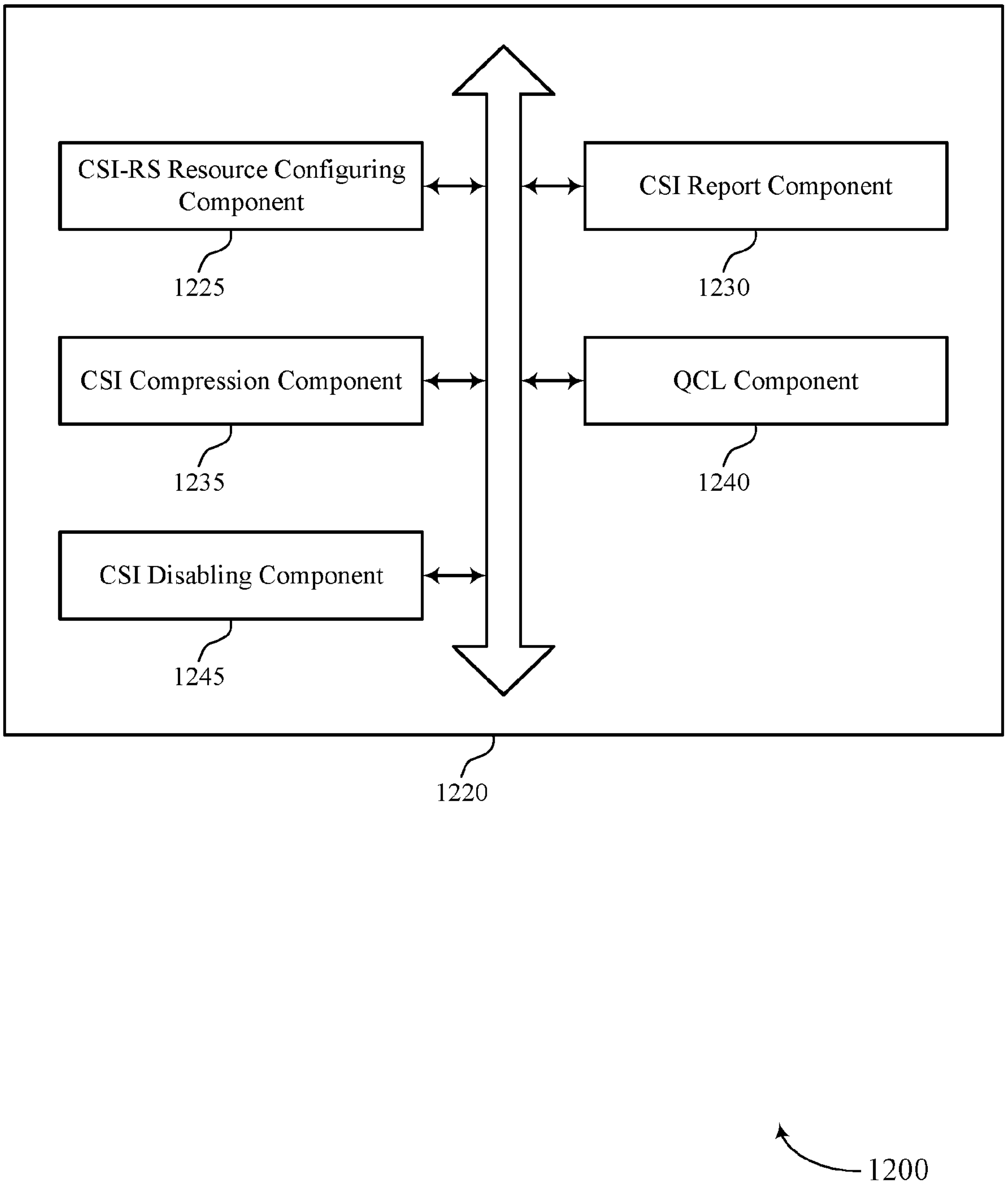
FIG. 12 shows a block diagram of a communications manager that supports techniques for CSI feedback with heterogenous panel deployment in accordance with aspects of the present disclosure.

FIG. 12 shows a block diagram 1200 of a communications manager 1220 that supports techniques for CSI feedback with heterogenous panel deployment in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for CSI feedback with heterogenous panel deployment as described herein. For example, the communications manager 1220 may include a CSI-RS resource configuring component 1225, a CSI report component 1230, a CSI compression component 1235, a QCL component 1240, a CSI disabling component 1245, or any combination thereof. Each of these components may communicate, directly or indirectly, with one another (e.g., via one or more buses).

The communications manager 1220 may support wireless communications at a base station in accordance with examples as disclosed herein. The CSI-RS resource configuring component 1225 may be configured as or otherwise support a means for transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The CSI report component 1230 may be configured as or otherwise support a means for receiving a CSI report including one or more sets of CSI parameters based on a codebook generated at the UE.

In some examples, to support transmitting the indication, the CSI-RS resource configuring component 1225 may be configured as or otherwise support a means for transmitting the indication of a single CSI-RS resource associated with the total number of antenna ports across the set of multiple antenna panels.

In some examples, to support receiving the CSI report, the CSI report component 1230 may be configured as or otherwise support a means for receiving the CSI report including a single set of CSI parameters.

In some examples, to support receiving the CSI report, the QCL component 1240 may be configured as or otherwise support a means for transmitting an indication of a per-antenna panel QCL configuration based on the set of multiple antenna panels at the base station being distributed.

In some examples, to support transmitting the indication, the CSI-RS resource configuring component 1225 may be configured as or otherwise support a means for transmitting the indication of a set of multiple CSI-RS resources corresponding to a number of antenna panels in the set of multiple antenna panels.

In some examples, to support receiving the CSI report, the CSI report component 1230 may be configured as or otherwise support a means for receiving a set of CSI parameters for each antenna panel of the set of multiple antenna panels.

In some examples, a rank indicator and a channel quality indicator for each set of CSI parameters and the set of inter-panel co-phasing parameters are jointly calculated based on the total number of antenna ports.

In some examples, the CSI disabling component 1245 may be configured as or otherwise support a means for transmitting control signaling indicating to disable CSI reporting for a first antenna panel of the set of multiple antenna panels.

In some examples, the CSI-RS resource configuring component 1225 may be configured as or otherwise support a means for transmitting an indication of a configuration for the set of multiple antenna panels, where a first antenna panel of the set of multiple antenna panels has more antenna elements in a vertical direction than a horizontal direction, and a second antenna panel of the set of multiple antenna panels has more antenna elements in the horizontal direction than the vertical direction.

In some examples, to support receiving the CSI report, the CSI compression component 1235 may be configured as or otherwise support a means for receiving an indication of a single index pair for the precoding matrix indicator for the set of multiple antenna panels based on the set of multiple antenna panels being co-located.

In some examples, the CSI compression component 1235 may be configured as or otherwise support a means for receiving an indication of an association between a first number of beams for a first antenna panel and a second number of beams for a second antenna panel, where the first number of beams and the second number of beams are different.

In some examples, the single index pair corresponds to a first antenna panel of the set of multiple antenna panels, and the CSI report includes differential index pair for a remaining set of antenna panels of the set of multiple antenna panels.

Figure 13:
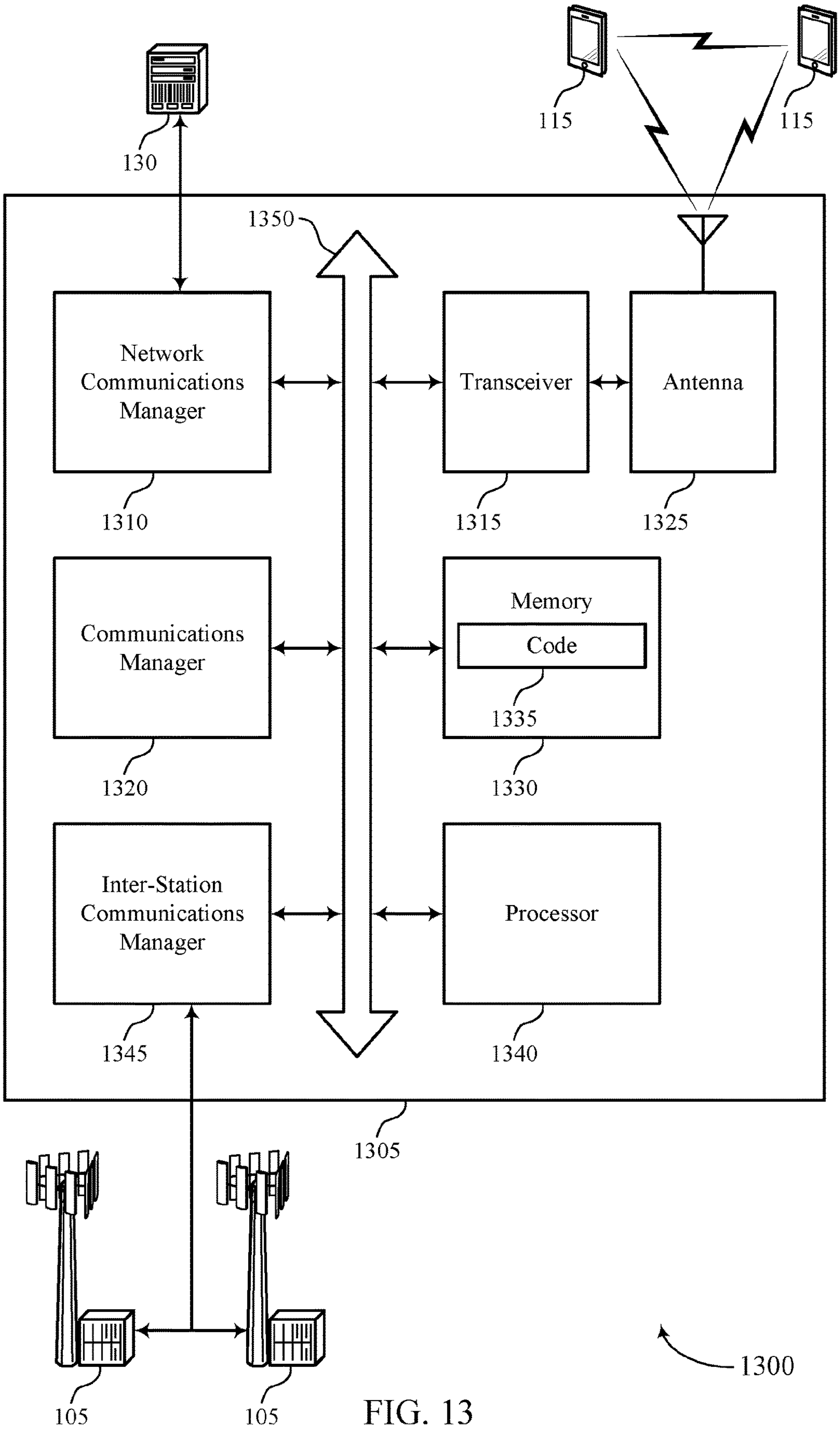
FIG. 13 shows a diagram of a system including a device that supports techniques for CSI feedback with heterogenous panel deployment in accordance with aspects of the present disclosure.

FIG. 13 shows a diagram of a system 1300 including a device 1305 that supports techniques for CSI feedback with heterogenous panel deployment in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for CSI feedback with heterogenous panel deployment). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The communications manager 1320 may be configured as or otherwise support a means for receiving a CSI report including one or more sets of CSI parameters based on a codebook generated at the UE.

By including or configuring the communications manager 1320 in accordance with examples as described herein, the device 1305 may support techniques for more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for CSI feedback with heterogenous panel deployment as described herein, or the processor 1340 and the memory 1330 may be otherwise configured to perform or support such operations.

Figure 14:
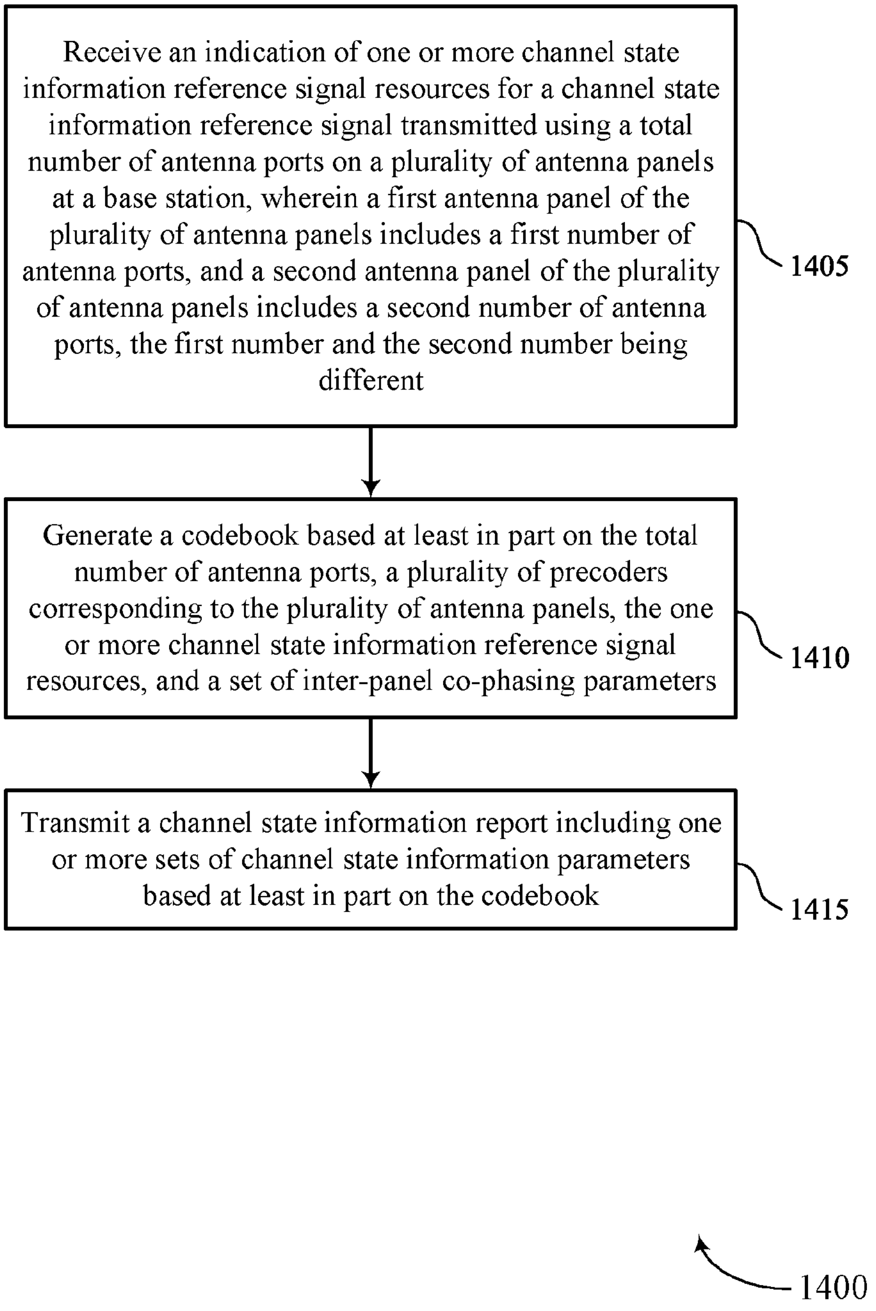
FIGS. 14 through 18 show flowcharts illustrating methods that support techniques for CSI feedback with heterogenous panel deployment in accordance with aspects of the present disclosure.

FIG. 14 shows a flowchart illustrating a method 1400 that supports techniques for CSI feedback with heterogenous panel deployment in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving an indication of one or more CSI-RS resources for a CSI-RS transmitted using a total number of antenna ports on a set of multiple antenna panels at a base station, where a first antenna panel of the set of multiple antenna panels includes a first number of antenna ports, and a second antenna panel of the set of multiple antenna panels includes a second number of antenna ports, the first number and the second number being different. The operations of 1405 may be performed in accordance with examples as disclosed herein. In some examples, aspects of the operations of 1405 may be performed by a CSI-RS resource configuration component 825 as described with reference to FIG. 8.

At 1410, the method may include generating a codebook based on the total number of antenna ports, a set of multiple precoders corresponding to the set of multiple antenna panels, the one or more CSI-RS resources, and a set of inter-panel co-phasing parameters. The operations of 1410 may be performed in accordance with examples as disclosed herein. In some examples, aspects of the operations of 1410 may be performed by a codebook generating component 830 as described with reference to FIG. 8.

At 1415, the method may include transmitting a CSI report including one or more sets of CSI parameters based on the codebook. The operations of 1415 may be performed in accordance with examples as disclosed herein. In some examples, aspects of the operations of 1415 may be performed by a CSI report component 835 as described with reference to FIG. 8.

Figure 15:
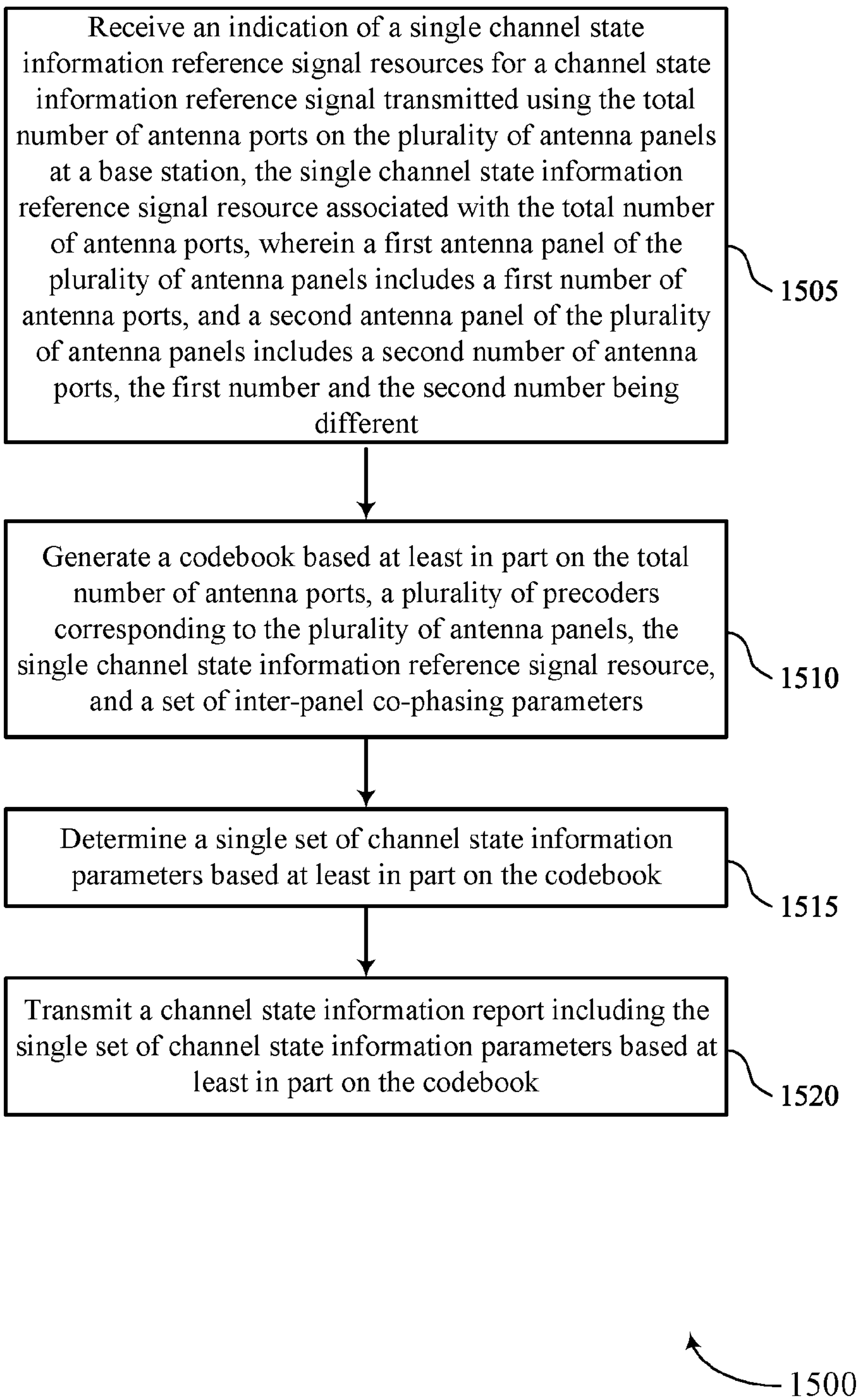

FIG. 15 shows a flowchart illustrating a method 1500 that supports techniques for CSI feedback with heterogenous panel deployment in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving an indication of a single CSI-RS resources for a CSI-RS transmitted using the total number of antenna ports on a set of multiple antenna panels at a base station, the single CSI-RS resource associated with the total number of antenna ports, where a first antenna panel of the set of multiple antenna panels includes a first number of antenna ports, and a second antenna panel of the set of multiple antenna panels includes a second number of antenna ports, the first number and the second number being different. The operations of 1505 may be performed in accordance with examples as disclosed herein. In some examples, aspects of the operations of 1505 may be performed by a CSI-RS resource configuration component 825 as described with reference to FIG. 8.

At 1510, the method may include generating a codebook based on the total number of antenna ports, a set of multiple precoders corresponding to the set of multiple antenna panels, the single CSI-RS resource, and a set of inter-panel co-phasing parameters. The operations of 1510 may be performed in accordance with examples as disclosed herein. In some examples, aspects of the operations of 1510 may be performed by a codebook generating component 830 as described with reference to FIG. 8.

At 1515, the method may include determining a single set of CSI parameters based on the codebook. The operations of 1515 may be performed in accordance with examples as disclosed herein. In some examples, aspects of the operations of 1515 may be performed by a CSI determining component 845 as described with reference to FIG. 8.

At 1520, the method may include transmitting a CSI report including the single set of CSI parameters based on the codebook. The operations of 1520 may be performed in accordance with examples as disclosed herein. In some examples, aspects of the operations of 1520 may be performed by a CSI report component 835 as described with reference to FIG. 8.

Figure 16:
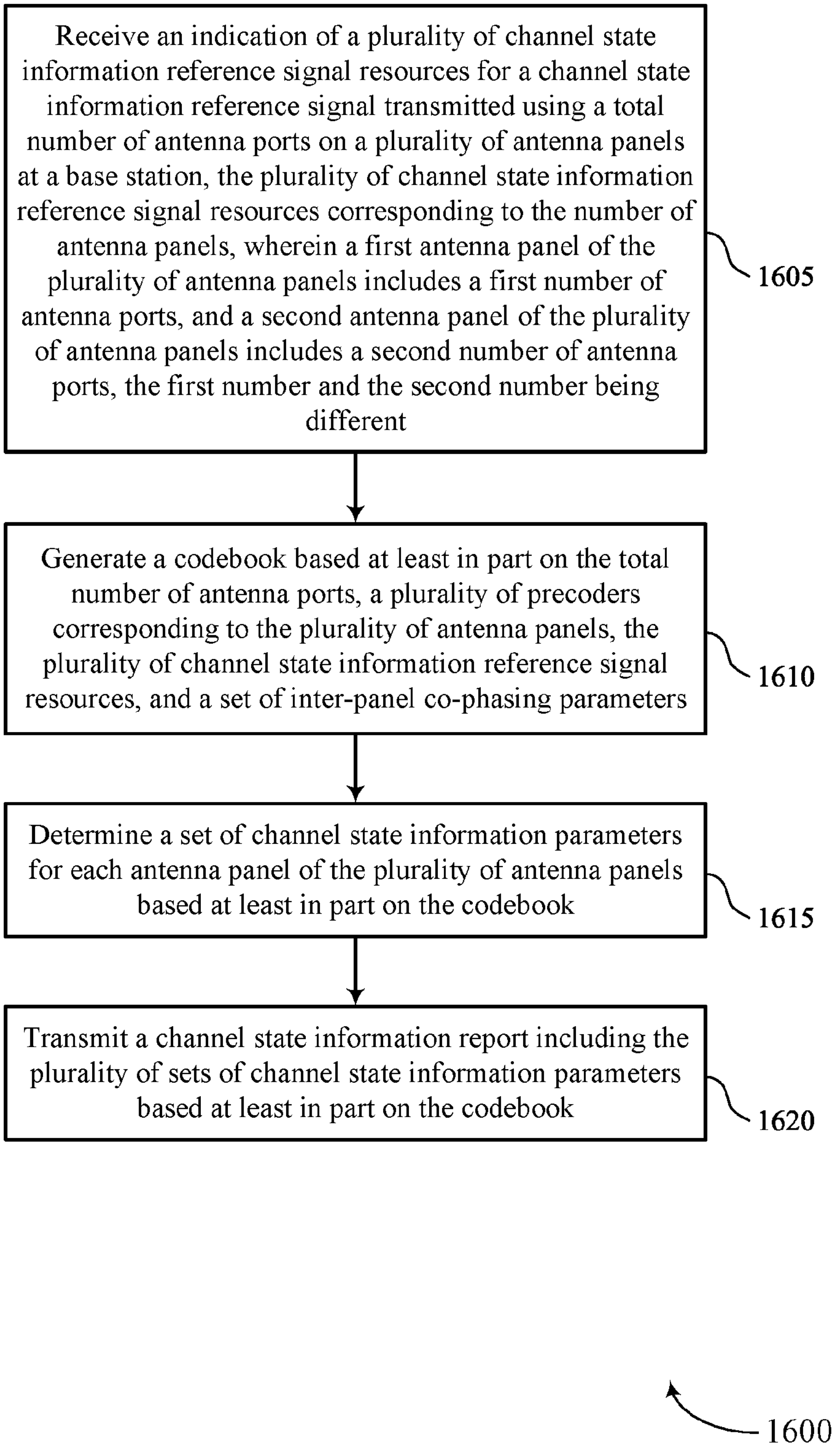

FIG. 16 shows a flowchart illustrating a method 1600 that supports techniques for CSI feedback with heterogenous panel deployment in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving an indication of a set of multiple CSI-RS resources for a CSI-RS transmitted using a total number of antenna ports on a set of multiple antenna panels at a base station, the set of multiple CSI-RS resources corresponding to the number of antenna panels, where a first antenna panel of the set of multiple antenna panels includes a first number of antenna ports, and a second antenna panel of the set of multiple antenna panels includes a second number of antenna ports, the first number and the second number being different. The operations of 1605 may be performed in accordance with examples as disclosed herein. In some examples, aspects of the operations of 1605 may be performed by a CSI-RS resource configuration component 825 as described with reference to FIG. 8.

At 1610, the method may include generating a codebook based on the total number of antenna ports, a set of multiple precoders corresponding to the set of multiple antenna panels, the set of multiple CSI-RS resources, and a set of inter-panel co-phasing parameters. The operations of 1610 may be performed in accordance with examples as disclosed herein. In some examples, aspects of the operations of 1610 may be performed by a codebook generating component 830 as described with reference to FIG. 8.

At 1615, the method may include determining a set CSI parameters for each antenna panel of the set of multiple antenna panels based on the codebook. The operations of 1615 may be performed in accordance with examples as disclosed herein. In some examples, aspects of the operations of 1615 may be performed by a CSI determining component 845 as described with reference to FIG. 8.

At 1620, the method may include transmitting a CSI report including the multiple sets of CSI parameters based on the codebook. The operations of 1620 may be performed in accordance with examples as disclosed herein. In some examples, aspects of the operations of 1620 may be performed by a CSI report component 835 as described with reference to FIG. 8.

Figure 17:
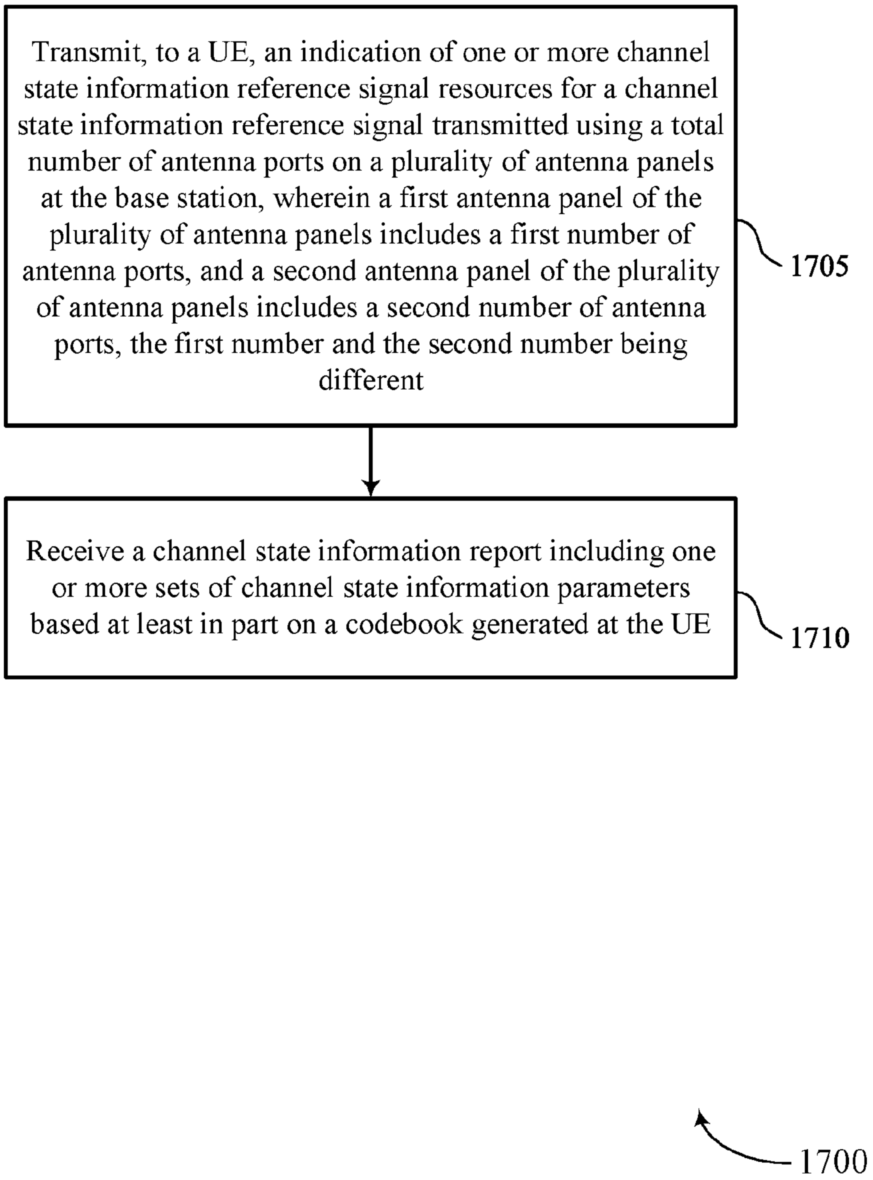

FIG. 17 shows a flowchart illustrating a method 1700 that supports techniques for CSI feedback with heterogenous panel deployment in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The operations of 1705 may be performed in accordance with examples as disclosed herein. In some examples, aspects of the operations of 1705 may be performed by a CSI-RS resource configuring component 1225 as described with reference to FIG. 12.

At 1710, the method may include receiving a CSI report including one or more sets of CSI parameters based on a codebook generated at the UE. The operations of 1710 may be performed in accordance with examples as disclosed herein. In some examples, aspects of the operations of 1710 may be performed by a CSI report component 1230 as described with reference to FIG. 12.

Figure 18:
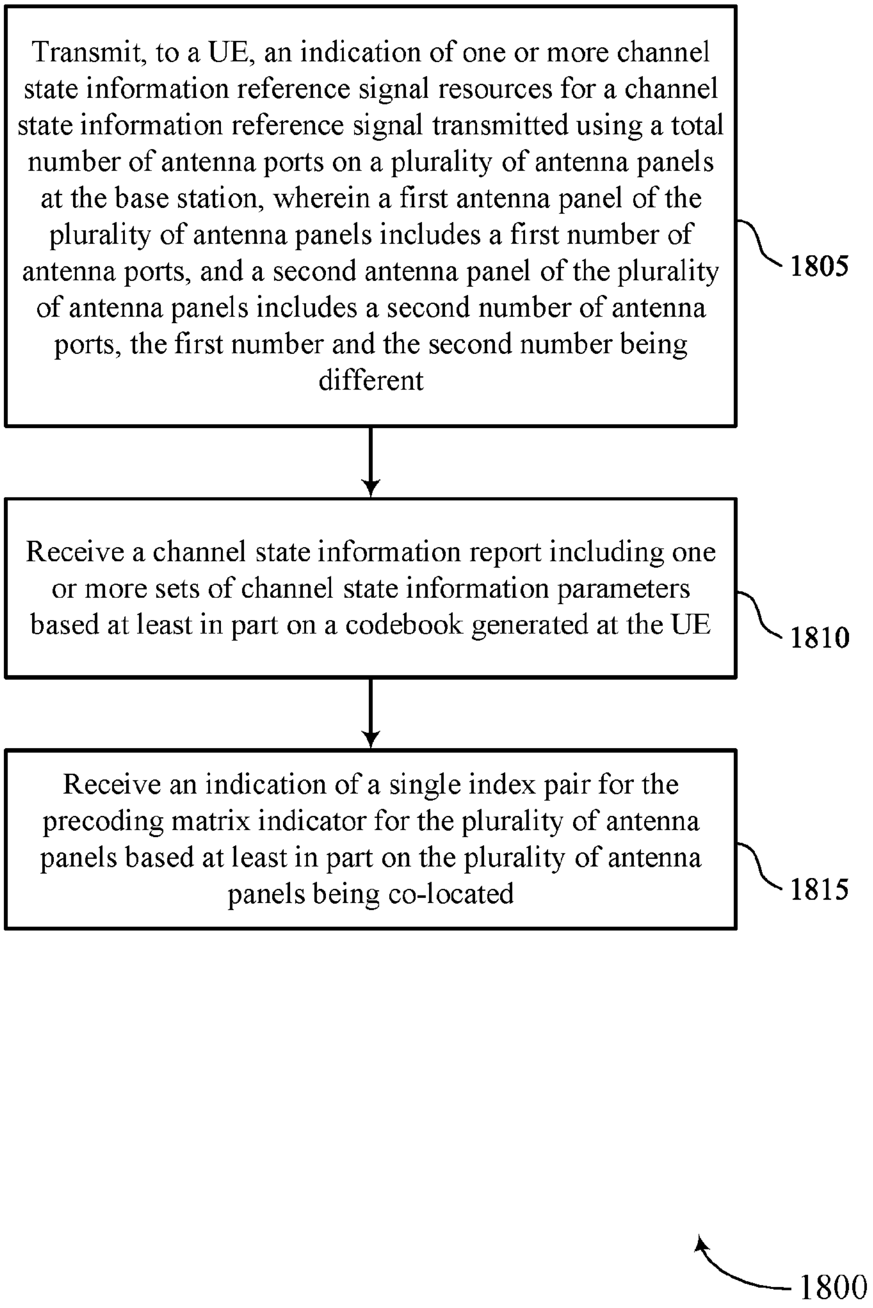

FIG. 18 shows a flowchart illustrating a method 1800 that supports techniques for CSI feedback with heterogenous panel deployment in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of one or more CSI-RS resources for a CSI-RS transmitted using a total number of antenna ports on a set of multiple antenna panels at the base station, where a first antenna panel of the set of multiple antenna panels includes a first number of antenna ports, and a second antenna panel of the set of multiple antenna panels includes a second number of antenna ports, the first number and the second number being different. The operations of 1805 may be performed in accordance with examples as disclosed herein. In some examples, aspects of the operations of 1805 may be performed by a CSI-RS resource configuring component 1225 as described with reference to FIG. 12.

At 1810, the method may include receiving a CSI report including one or more sets of CSI parameters based on a codebook generated at the UE. The operations of 1810 may be performed in accordance with examples as disclosed herein. In some examples, aspects of the operations of 1810 may be performed by a CSI report component 1230 as described with reference to FIG. 12.

At 1815, the method may include receiving an indication of a single index pair for the precoding matrix indicator for the set of multiple antenna panels based on the set of multiple antenna panels being co-located. The operations of 1815 may be performed in accordance with examples as disclosed herein. In some examples, aspects of the operations of 1815 may be performed by a CSI compression component 1235 as described with reference to FIG. 12.

The following provides an overview of aspects of the present disclosure:

Aspect 1: A method for wireless communications at a UE, comprising: receiving an indication of one or more channel state information reference signal resources for a channel state information reference signal transmitted using a total number of antenna ports on a plurality of antenna panels at a base station, wherein a first antenna panel of the plurality of antenna panels includes a first number of antenna ports, and a second antenna panel of the plurality of antenna panels includes a second number of antenna ports, the first number and the second number being different; generating a codebook based at least in part on the total number of antenna ports, a plurality of precoders corresponding to the plurality of antenna panels, the one or more channel state information reference signal resources, and a set of inter-panel co-phasing parameters; and transmitting a channel state information report including one or more sets of channel state information parameters based at least in part on the codebook.

Aspect 2: The method of aspect 1, wherein receiving the indication comprises: receiving the indication of a single channel state information reference signal resource associated with the total number of antenna ports on the plurality of antenna panels.

Aspect 3: The method of aspect 2, further comprising: determining a single set of channel state information parameters based at least in part on the codebook.

Aspect 4: The method of any of aspects 2 through 3, further comprising: receiving an indication of a per-antenna panel quasi co-location (QCL) configuration based at least in part on the plurality of antenna panels at the base station being distributed.

Aspect 5: The method of any of aspects 1 through 4, wherein receiving the indication comprises: receiving the indication of a plurality of channel state information reference signal resources corresponding to a number of antenna panels in the plurality of antenna panels.

Aspect 6: The method of aspect 5, further comprising: determining a set of channel state information parameters for each antenna panel of the plurality of antenna panels based at least in part on the codebook.

Aspect 7: The method of aspect 6, wherein a corresponding plurality of rank indicators and a corresponding plurality of channel quality indicators for each set of channel state information parameters and the set of inter-panel co-phasing parameters are jointly determined based at least in part on the total number of antenna ports.

Aspect 8: The method of any of aspects 5 through 7, further comprising: receiving control signaling indicating to disable channel state information reporting for an antenna panel of the plurality of antenna panels.

Aspect 9: The method of any of aspects 1 through 8, further comprising: mapping the plurality of precoders to the one or more channel state information reference signal resources based at least in part on respective channel state information reference signal indexes.

Aspect 10: The method of any of aspects 1 through 9, further comprising: receiving an indication of a configuration for the plurality of antenna panels, wherein the first antenna panel of the plurality of antenna panels has more antenna elements in a vertical direction than a horizontal direction, and the second antenna panel of the plurality of antenna panels has more antenna elements in the horizontal direction than the vertical direction.

Aspect 11: The method of any of aspects 1 through 10, wherein transmitting the channel state information report comprises: indicating a single index pair for a precoding matrix indicator for the plurality of antenna panels based at least in part on the plurality of antenna panels being co-located.

Aspect 12: The method of aspect 11, further comprising: applying an oversampling rate to a first number of beams for the first antenna panel of the plurality of antenna panels to correspond to a second number of beams of the second antenna panel of the plurality of antenna panels.

Aspect 13: The method of any of aspects 11 through 12, further comprising: indicating an association between a first number of beams for the first antenna panel and a second number of beams for the second antenna panel, wherein the first number of beams and the second number of beams are different.

Aspect 14: The method of any of aspects 11 through 13, wherein the single index pair corresponds to the first antenna panel of the plurality of antenna panels, and the channel state information report includes differential index pair for a remaining set of antenna panels of the plurality of antenna panels.

Aspect 15: A method for wireless communications at a base station, comprising: transmitting, to a UE, an indication of one or more channel state information reference signal resources for a channel state information reference signal transmitted using a total number of antenna ports on a plurality of antenna panels at the base station, wherein a first antenna panel of the plurality of antenna panels includes a first number of antenna ports, and a second antenna panel of the plurality of antenna panels includes a second number of antenna ports, the first number and the second number being different; receiving a channel state information report including one or more sets of channel state information parameters based at least in part on a codebook generated at the UE.

Aspect 16: The method of aspect 15, wherein transmitting the indication comprises: transmitting the indication of a single channel state information reference signal resource associated with the total number of antenna ports on the plurality of antenna panels.

Aspect 17: The method of aspect 16, wherein receiving the channel state information report comprises: receiving the channel state information report including a single set of channel state information parameters.

Aspect 18: The method of any of aspects 16 through 17, further comprising: transmitting an indication of a per-antenna panel quasi co-location (QCL) configuration based at least in part on the plurality of antenna panels at the base station being distributed.

Aspect 19: The method of any of aspects 15 through 18, wherein transmitting the indication comprises: transmitting the indication of a plurality of channel state information reference signal resources corresponding to a number of antenna panels in the plurality of antenna panels.

Aspect 20: The method of aspect 19, wherein receiving the channel state information report comprises: receiving a set of channel state information parameters for each antenna panel of the plurality of antenna panels.

Aspect 21: The method of aspect 20, wherein a rank indicator and a channel quality indicator in each set of channel state information parameters and a set of inter-panel co-phasing parameters are jointly calculated based at least in part on the total number of antenna ports.

Aspect 22: The method of any of aspects 19 through 21, further comprising: transmitting control signaling indicating to disable channel state information reporting for an antenna panel of the plurality of antenna panels.

Aspect 23: The method of any of aspects 15 through 22, further comprising: transmitting an indication of a configuration for the plurality of antenna panels, wherein the first antenna panel of the plurality of antenna panels has more antenna elements in a vertical direction than a horizontal direction, and the second antenna panel of the plurality of antenna panels has more antenna elements in the horizontal direction than the vertical direction.

Aspect 24: The method of any of aspects 15 through 23, wherein receiving the channel state information report comprises: receiving an indication of a single index pair for a precoding matrix indicator for the plurality of antenna panels based at least in part on the plurality of antenna panels being co-located.

Aspect 25: The method of aspect 24, further comprising: receiving an indication of an association between a first number of beams for the first antenna panel and a second number of beams for the second antenna panel, wherein the first number of beams and the second number of beams are different.

Aspect 26: The method of any of aspects 24 through 25, wherein the single index pair corresponds to the first antenna panel of the plurality of antenna panels, and the channel state information report includes differential index pair for a remaining set of antenna panels of the plurality of antenna panels.

Aspect 27: An apparatus for wireless communications at a UE, comprising a processor; memory coupled with the processor; and instructions stored in the memory and executable by the processor to cause the apparatus to perform a method of any of aspects 1 through 14.

Aspect 28: An apparatus for wireless communications at a UE, comprising at least one means for performing a method of any of aspects 1 through 14.

Aspect 29: A non-transitory computer-readable medium storing code for wireless communications at a UE, the code comprising instructions executable by a processor to perform a method of any of aspects 1 through 14.

Aspect 30: An apparatus for wireless communications at a base station, comprising a processor; memory coupled with the processor; and instructions stored in the memory and executable by the processor to cause the apparatus to perform a method of any of aspects 15 through 26.

Aspect 31: An apparatus for wireless communications at a base station, comprising at least one means for performing a method of any of aspects 15 through 26.

Aspect 32: A non-transitory computer-readable medium storing code for wireless communications at a base station, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving an indication of one or more channel state information reference signal resources for a channel state information reference signal transmitted using a total number of antenna ports on a plurality of antenna panels at a network device, wherein a first antenna panel of the plurality of antenna panels includes a first number of antenna ports, and a second antenna panel of the plurality of antenna panels includes a second number of antenna ports, the first number and the second number being different;

generating a codebook based at least in part on the total number of antenna ports, a plurality of precoders corresponding to the plurality of antenna panels, the one or more channel state information reference signal resources, and a set of inter-panel co-phasing parameters; and transmitting a channel state information report including one or more sets of channel state information parameters based at least in part on the codebook.

2. The method of claim 1, wherein receiving the indication comprises:

receiving the indication of a single channel state information reference signal resource associated with the total number of antenna ports on the plurality of antenna panels.

3. The method of claim 2, further comprising:

determining a single set of channel state information parameters based at least in part on the codebook.

4. The method of claim 2, further comprising:

receiving an indication of a per-antenna panel quasi co-location (QCL) configuration based at least in part on the plurality of antenna panels at the network device being distributed.

5. The method of claim 1, wherein receiving the indication comprises:

receiving the indication of a plurality of channel state information reference signal resources corresponding to a number of antenna panels in the plurality of antenna panels.

6. The method of claim 5, further comprising:

determining a set of channel state information parameters for each antenna panel of the plurality of antenna panels based at least in part on the codebook.

7. The method of claim 6, wherein a rank indicator and a channel quality indicator for each set of channel state information parameters and the set of inter-panel co-phasing parameters are jointly determined based at least in part on the total number of antenna ports.

8. The method of claim 5, further comprising:

receiving control signaling indicating to disable channel state information reporting for an antenna panel of the plurality of antenna panels.

9. The method of claim 1, further comprising:

mapping the plurality of precoders to the one or more channel state information reference signal resources based at least in part on respective channel state information reference signal indexes.

10. The method of claim 1, further comprising:

receiving an indication of a configuration for the plurality of antenna panels, wherein the first antenna panel of the plurality of antenna panels has more antenna elements in a vertical direction than a horizontal direction, and the second antenna panel of the plurality of antenna panels has more antenna elements in the horizontal direction than the vertical direction.

11. The method of claim 1, wherein transmitting the channel state information report comprises:

indicating a single index pair for a precoding matrix indicator for the plurality of antenna panels based at least in part on the plurality of antenna panels being co-located.

12. The method of claim 11, further comprising:

applying an oversampling rate to a first number of beams for the first antenna panel of the plurality of antenna panels to correspond to a second number of beams of the second antenna panel of the plurality of antenna panels.

13. The method of claim 11, further comprising:

indicating an association between a first number of beams for the first antenna panel and a second number of beams for the second antenna panel, wherein the first number of beams and the second number of beams are different.

14. The method of claim 11, wherein the single index pair corresponds to the first antenna panel of the plurality of antenna panels, and the channel state information report includes differential index pair for a remaining set of antenna panels of the plurality of antenna panels.

15. A method for wireless communications at a network device, comprising:

transmitting, to a user equipment (UE), an indication of one or more channel state information reference signal resources for a channel state information reference signal transmitted using a total number of antenna ports on a plurality of antenna panels at the network device, wherein a first antenna panel of the plurality of antenna panels includes a first number of antenna ports, and a second antenna panel of the plurality of antenna panels includes a second number of antenna ports, the first number and the second number being different; and receiving a channel state information report including one or more sets of channel state information parameters based at least in part on a codebook generated at the UE, wherein the codebook is based at least in part on the total number of antenna ports, a plurality of precoders corresponding to the plurality of antenna panels, the one or more channel state information reference signal resources, and a set of inter-panel co-phasing parameters.

16. The method of claim 15, wherein transmitting the indication comprises:

transmitting the indication of a single channel state information reference signal resource associated with the total number of antenna ports on the plurality of antenna panels.

17. The method of claim 16, wherein receiving the channel state information report comprises:

receiving the channel state information report including a single set of channel state information parameters.

18. The method of claim 16, further comprising:

transmitting an indication of a per-antenna panel quasi co-location (QCL) configuration based at least in part on the plurality of antenna panels at the network device being distributed.

19. The method of claim 15, wherein transmitting the indication comprises:

transmitting the indication of a plurality of channel state information reference signal resources corresponding to a number of antenna panels in the plurality of antenna panels.

20. The method of claim 19, wherein receiving the channel state information report comprises:

receiving a set of channel state information parameters for each antenna panel of the plurality of antenna panels.

21. The method of claim 20, wherein a rank indicator and a channel quality indicator for each set of channel state information parameters and the set of inter-panel co-phasing parameters are jointly calculated based at least in part on the total number of antenna ports.

22. The method of claim 19, further comprising:

transmitting control signaling indicating to disable channel state information reporting for an antenna panel of the plurality of antenna panels.

23. The method of claim 15, further comprising:

transmitting an indication of a configuration for the plurality of antenna panels, wherein the first antenna panel of the plurality of antenna panels has more antenna elements in a vertical direction than a horizontal direction, and the second antenna panel of the plurality of antenna panels has more antenna elements in the horizontal direction than the vertical direction.

24. The method of claim 15, wherein receiving the channel state information report comprises:

receiving an indication of a single index pair for a precoding matrix indicator for the plurality of antenna panels based at least in part on the plurality of antenna panels being co-located.

25. The method of claim 24, further comprising:

receiving an indication of an association between a first number of beams for the first antenna panel and a second number of beams for the second antenna panel, wherein the first number of beams and the second number of beams are different.

26. The method of claim 24, wherein the single index pair corresponds to the first antenna panel of the plurality of antenna panels, and the channel state information report includes differential index pair for a remaining set of antenna panels of the plurality of antenna panels.

27. A user equipment (UE) for wireless communications, comprising:

one or more processors;

one or more memories coupled with the one or more processors; and instructions stored in the one or more memories and executable by the one or more processors to cause the UE to:

receive an indication of one or more channel state information reference signal resources for a channel state information reference signal transmitted using a total number of antenna ports on a plurality of antenna panels at a network device, wherein a first antenna panel of the plurality of antenna panels includes a first number of antenna ports, and a second antenna panel of the plurality of antenna panels includes a second number of antenna ports, the first number and the second number being different;

generate a codebook based at least in part on the total number of antenna ports, a plurality of precoders corresponding to the plurality of antenna panels, the one or more channel state information reference signal resources, and a set of inter-panel co-phasing parameters; and transmit a channel state information report including one or more sets of channel state information parameters based at least in part on the codebook.

28. The UE of claim 27, wherein the instructions to receive the indication are executable by the one or more processors to cause the UE to:

receive the indication of a single channel state information reference signal resource associated with the total number of antenna ports on the plurality of antenna panels.

29. The UE of claim 27, wherein the instructions to receive the indication are executable by the one or more processors to cause the UE to:

receive the indication of a plurality of channel state information reference signal resources corresponding to a number of antenna panels in the plurality of antenna panels.

30. A network device for wireless communications, comprising:

one or more processors;

one or more memories coupled with the one or more processors; and instructions stored in the one or more memories and executable by the one or more processors to cause the network device to:

transmit, to a user equipment (UE), an indication of one or more channel state information reference signal resources for a channel state information reference signal transmitted using a total number of antenna ports on a plurality of antenna panels at the network device, wherein a first antenna panel of the plurality of antenna panels includes a first number of antenna ports, and a second antenna panel of the plurality of antenna panels includes a second number of antenna ports, the first number and the second number being different; and receive a channel state information report including one or more sets of channel state information parameters based at least in part on a codebook generated at the UE, wherein the codebook is based at least in part on the total number of antenna ports, a plurality of precoders corresponding to the plurality of antenna panels, the one or more channel state information reference signal resources, and a set of inter-panel co-phasing parameters.

* * * * *